(12) United States Patent
Norieda et al.

(10) Patent No.: US 12,106,619 B2
(45) Date of Patent: Oct. 1, 2024

(54) SERVER DEVICE, ENTRY/EXIT MANAGEMENT METHOD AND PROGRAM RECORDING MEDIUM

(71) Applicant: NEC Corporation, Tokyo (JP)

(72) Inventors: Shin Norieda, Tokyo (JP); Kenta Fukuoka, Tokyo (JP); Masashi Yoneda, Tokyo (JP); Shogo Akasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 17/789,554

(22) PCT Filed: Feb. 28, 2020

(86) PCT No.: PCT/JP2020/008514
§ 371 (c)(1),
(2) Date: Jun. 28, 2022

(87) PCT Pub. No.: WO2021/171614
PCT Pub. Date: Sep. 2, 2021

(65) Prior Publication Data
US 2023/0037797 A1    Feb. 9, 2023

(51) Int. Cl.
*G07C 9/00* (2020.01)
*G06Q 10/10* (2023.01)
*G06Q 10/1093* (2023.01)

(52) U.S. Cl.
CPC ..... *G07C 9/00563* (2013.01); *G06Q 10/1095* (2013.01)

(58) Field of Classification Search
CPC .... G06Q 10/10; G06Q 10/1095; G06Q 10/06; G07C 9/38; G07C 9/00563; G07C 9/37;
(Continued)

(56) References Cited

U.S. PATENT DOCUMENTS

| 10,158,831 | B1* | 12/2018 | Taub | H04Q 9/02 |
| 2004/0064709 | A1* | 4/2004 | Heath | G07C 9/37 |
| | | | | 713/186 |

(Continued)

FOREIGN PATENT DOCUMENTS

| JP | 2004-326407 A | 11/2004 |
| JP | 2009-086897 A | 4/2009 |
| JP | 2019-101566 A | 6/2019 |

OTHER PUBLICATIONS

International Search Report for PCT Application No. PCT/JP2020/008514, mailed on Jul. 28, 2020.
(Continued)

*Primary Examiner* — Yong Hang Jiang

(57) ABSTRACT

The server device includes an acquisition unit, a user database, an attendee management database, and a processing unit. The acquisition unit acquires biological information for each of a plurality of users using an entry/exit management system. The user database associates the biological information with user IDs respectively identifying the users and stores the same. The attendee management database associates the user ID corresponding to an attendee in a restricted area, into which entry and exit is restricted, with position information for the attendee, and stores the same. The processing unit transmits the position information of a meeting candidate, who a visitor wants to meet, to an authentication terminal. The authentication terminal is a terminal which, if an authentication using the biological information recorded in the user database is successful, permits a successfully authenticated user to enter the restricted area.

8 Claims, 29 Drawing Sheets

(58) Field of Classification Search
CPC .... G06V 40/172; G06V 40/103; G06V 20/52; G06V 40/166; A61B 5/01; A61B 5/6887; G06T 1/00; G06T 7/00; G16H 40/67; G16H 20/00
See application file for complete search history.

(56) References Cited

U.S. PATENT DOCUMENTS

| | | | |
|---|---|---|---|
| 2009/0161921 A1* | 6/2009 | Ohnishi | G06V 40/172 |
| | | | 382/115 |
| 2013/0242074 A1* | 9/2013 | Sekiguchi | G06V 40/103 |
| | | | 348/77 |
| 2015/0054616 A1* | 2/2015 | Friedman | G07C 9/27 |
| | | | 340/5.53 |
| 2016/0352726 A1* | 12/2016 | Hyde | H04L 63/0861 |
| 2017/0270722 A1* | 9/2017 | Tse | G08B 21/18 |
| 2020/0233680 A1* | 7/2020 | Ma | G06F 16/252 |
| 2020/0234523 A1* | 7/2020 | Ma | G08G 1/149 |
| 2024/0112139 A1* | 4/2024 | Hirasawa | G06V 40/172 |

OTHER PUBLICATIONS

English translation of Written opinion for PCT Application No. PCT/JP2020/008514, mailed on Jul. 28, 2020.

* cited by examiner

Fig.8

```
SYSTEM USER REGISTRATION

NAME            [                    ]
EMPLOYEE        [                    ]
NUMBER
DEPARTMENT
TO WHICH USER   [                    ]
BELONGS
TITLE           [                    ]

FREE            [                    ]
DESCRIPTION     [                    ]

REGISTER FACE IMAGE FILE.

[ FILE SELECTION ]

SELECT NEW REGISTRATION OR UPDATE
REGISTERED CONTENT.

[ NEW         ]    [ UPDATE ]
    [ REGISTRATION]

[     TRANSMIT     ]
```

Fig.10

USER DATABASE

| USER ID | FEATURE AMOUNT | FACE IMAGE | NAME | EMPLOYEE NUMBER | DEPARTMENT TO WHICH USER BELONGS | TITLE | ... |
|---|---|---|---|---|---|---|---|
| ID01 | FV1 | F1 | AAA | 12345X1 | X11 | X21 | ... |
| ID02 | FV2 | F2 | BBB | 12345X2 | X12 | X22 | ... |
| ID03 | FV3 | F3 | CCC | 12345X4 | X13 | X23 | ... |
| ... | ... | ... | ... | ... | ... | ... | ... |

Fig.11

ATTENDEE MANAGEMENT DATABASE

| USER ID | ENTRY DATE AND TIME | POSITION INFORMATION |
|---------|---------------------|----------------------|
| ID01 | 2020/1/20 12:01:01 | (X1,Y1) |
| ID02 | 2020/1/20 12:10:13 | (X2,Y2) |
| ID03 | 2020/1/20 12:13:25 | (X3,Y3) |
| ID04 | 2020/1/20 12:30:30 | (X4,Y4) |
| ... | ... | ... |

Fig.12

ATTENDEE MANAGEMENT DATABASE

| USER ID | ENTRY DATE AND TIME | POSITION INFORMATION | STATE |
|---|---|---|---|
| ID01 | 2020/1/20 12:01:01 | (X1,Y1) | IN MEETING |
| ID02 | 2020/1/20 12:02:13 | (X2,Y2) | IN MEETING |
| ID03 | 2020/1/20 12:13:25 | (X3,Y3) | NORMAL WORK |
| ID04 | 2020/1/20 12:30:30 | (X4,Y4) | NORMAL WORK |
| ... | ... | ... | ... |

Fig.18

ENTRY OF INFORMATION OF MEETING DESIRED PERSON

PLEASE SPECIFY HOW TO SEARCH FOR PERSON WHOM YOU WANT TO MEET WITH.

DEPARTMENT TO WHICH MEETING DESIRED PERSON BELONGS

TIME ZONE OF ENTRY

WORK STATE

ENTRY OF INFORMATION OF MEETING DESIRED PERSON

PLEASE ENTER DEPARTMENT TO WHICH PERSON YOU WANT TO MEET WITH BELONGS.

X11

CONFIRMATION

Fig.19B

ENTRY OF INFORMATION OF MEETING DESIRED PERSON

PLEASE ENTER TIME ZONE.

11:00 – 12:00 ▼

CONFIRMATION

Fig.19C

ENTRY OF INFORMATION OF MEETING DESIRED PERSON

PLEASE SELECT ONE OF FOLLOWING.

◉ IN MEETING
○ NORMAL WORK

CONFIRMATION

Fig.21

CONFERENCE ROOM MANAGEMENT DATABASE

| USER ID | CONFERENCE ROOM | USE TIME |
|---------|-----------------|----------|
| ID01 | CONFERENCE ROOM A | 2020/1/20 10:00 – 11:00 |
| ID02 | CONFERENCE ROOM A | 2020/1/20 10:00 – 11:00 |
| ID03 | CONFERENCE ROOM A | 2020/1/20 10:00 – 11:00 |
| ID04 | CONFERENCE ROOM B | 2020/1/22 13:00 – 15:00 |
| ... | ... | ... |

Fig.23

CONFERENCE DETAILED INFORMATION

CONFERENCE ROOM NUMBER: A

CONFERENCE TIME: 10:00 – 11:00

PARTICIPANT:
AAA
BBB
CCC

SERVER DEVICE, ENTRY/EXIT MANAGEMENT METHOD AND PROGRAM RECORDING MEDIUM

This application is a National Stage Entry of PCT/JP2020/008514 filed on Feb. 28, 2020, the contents of all of which are incorporated herein by reference, in their entirety.

TECHNICAL FIELD

The present invention relates to a server device, an entry/exit management system, an entry/exit management method, and a program.

BACKGROUND ART

In recent years, various ways of working have been promoted.

For example, a "free address" has been promoted in which work is performed without determining a specific desk and by freely using vacant seats.

For example, Patent Literature 1 describes providing a system capable of confirming the occupancy status of the user without moving to the seat position. The system disclosed in Patent Literature 1 includes a user terminal and a server. The user terminal is provided with a camera. The user terminal detects the face of the user based on the input image from the camera, and determines whether the user is present to transmit presence information indicating a determination result to the server. The server stores the presence information transmitted from each user terminal. In a case where there is a request for confirmation of the presence information about the user from the terminal of another user, the server transmits the stored presence information to the terminal of the another user.

CITATION LIST

Patent Literature

[PTL 1] JP 2019-101566 A

SUMMARY OF INVENTION

Technical Problem

Here, an employee belonging to a specific department may use one free address floor, but a large number of employees beyond the department may use the floor. In this case, there may be a problem that it takes time to search for a person necessary for a meeting or the like on the floor due to a reason such as first meeting between persons who are to meet with each other.

It is a main object of the present invention to provide a server device, an entry/exit management system, an entry/exit management method, and a program that contribute to enabling a visitor to easily grasp a position of a person whom the visitor desires to meet with.

Solution to Problem

According to a first aspect of the present invention, there is provided a server device including an acquisition unit that acquires biological information of each of a plurality of users who uses an entry/exit management system, a user database that stores a user ID for identifying each user and the biological information in association with each other, an attendee management database that stores the user ID related to an attendee in a restricted area where entry/exit is restricted, and position information about the attendee in association with each other, and a processing unit that transmits, in a case where authentication using biological information stored in the user database has succeeded, to an authentication terminal that permits a successfully authenticated user to enter the restricted area, position information about a meeting desired person whom a visitor desires to meet with.

According to a second aspect of the present invention, there is provided an entry/exit management system including a server device including an acquisition unit that acquires biological information of each of a plurality of users who uses the system, a user database that stores a user ID for identifying each user and the biological information in association with each other, an attendee management database that stores the user ID related to an attendee in a restricted area where entry/exit is restricted, and position information about the attendee in association with each other, and a processing unit that processes a request from a terminal, and an authentication terminal that permits, in a case where authentication using biological information stored in the user database has succeeded, a successfully authenticated user to enter the restricted area, in which the processing unit transmits position information about a meeting desired person whom a visitor desires to meet with to the authentication terminal.

According to a third aspect of the present invention, there is provided an entry/exit management method including, by a server device, acquiring biological information of each of a plurality of users who uses an entry/exit management system, storing, in a user database, a user ID for identifying each user and the biological information in association with each other, storing, in an attendee management database, the user ID related to an attendee in a restricted area where entry/exit is restricted, and position information about the attendee in association with each other, and transmitting, in a case where authentication using biological information stored in the user database has succeeded, to an authentication terminal that permits a successfully authenticated user to enter the restricted area, position information about a meeting desired person whom a visitor desires to meet with.

According to a fourth aspect of the present invention, there is provided a computer-readable storage medium storing a program for causing a computer mounted on a server device to execute a step of acquiring biological information of each of a plurality of users who uses an entry/exit management system, a step of storing, in a user database, a user ID for identifying each user and the biological information in association with each other, a step of storing, in an attendee management database, the user ID related to an attendee in a restricted area where entry/exit is restricted, and position information about the attendee in association with each other, and a step of transmitting, in a case where authentication using biological information stored in the user database has succeeded, to an authentication terminal that permits a successfully authenticated user to enter the restricted area, position information about a meeting desired person whom a visitor desires to meet with.

Advantageous Effects of Invention

According to each aspect of the present invention, there is provided a server device, an entry/exit management system, an entry/exit management method, and a program that contribute to easily grasping a position of a person whom a visitor wants to meet with. The effect of the present invention is not limited to the above. According to the present invention, other effects may be exhibited instead of or in addition to the effect.

BRIEF DESCRIPTION OF DRAWINGS

FIG. 8 is a diagram for explaining an operation of a user information acquisition unit according to the first example embodiment.

FIG. 10 is a diagram illustrating an example of a user database according to the first example embodiment.

FIG. 11 is a diagram illustrating an example of an attendee management database according to the first example embodiment.

FIG. 12 is a diagram illustrating an example of an attendee management database according to the first example embodiment.

FIG. 18 is a diagram illustrating an example of display by the authentication terminal according to a fourth example embodiment.

FIG. 19A is a diagram illustrating an example of display by the authentication terminal, in a case where the search based on the department to which the meeting desired person belongs is selected, according to the fourth example embodiment.

FIG. 19B is a diagram illustrating an example of display by the authentication terminal, in a case where the search based on the time zone in which the meeting desired person enters the area is selected, according to the fourth example embodiment.

FIG. 19C is a diagram illustrating an example of display by the authentication terminal, when the search based on the work state is selected, according to the fourth example embodiment.

FIG. 21 is a diagram illustrating an example of a conference room management database according to the fifth example embodiment.

FIG. 23 is a diagram for explaining the operation of a conference information display unit according to the fifth example embodiment.

EXAMPLE EMBODIMENT

Figure 1:
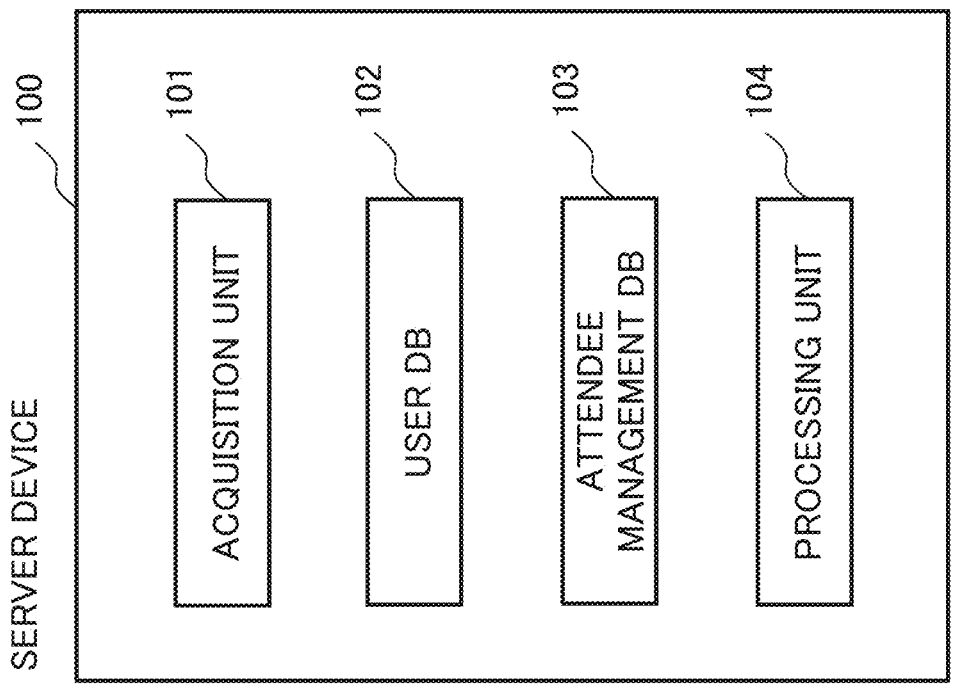
FIG. 1 is a diagram for describing an outline of an example embodiment.

First, an outline of an example embodiment will be described. The reference numerals in the drawings attached to this outline are attached to respective elements for convenience as an example for assisting understanding, and the description of this outline is not intended to be any limitation. Unless there is a specific reason to the contrary, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

A server device 100 according to an exemplary example embodiment includes an acquisition unit 101, a user database 102, an attendee management database 103, and a processing unit 104 (see FIG. 1). The acquisition unit 101 acquires biological information for each of a plurality of users using an entry/exit management system. The user database 102 stores a user ID for identifying a user and biological information in association with each other. The attendee management database 103 stores the user ID related to an attendee in a restricted area, where entry/exit is restricted, and position information for the attendee in association with each other. The processing unit 104 transmits the position information about a meeting desired person, whom a visitor wants to meet with, to an authentication terminal. The authentication terminal is a terminal that, when an authentication using the biological information recorded in the user database is successful, permits a successfully authenticated user to enter the restricted area.

The server device 100 refers to the user database and the attendee management database, and acquires the position information about the person whom the visitor desires to meet with. The position information about the meeting desired person is transmitted to the authentication terminal, and is displayed in such a way that the visitor can grasp the position of the meeting desired person. As a result, the visitor can easily grasp the position of the person whom the visitor wants to meet with.

Hereinafter, specific example embodiments will be described in more detail with reference to the drawings.

First Example Embodiment

The first example embodiment will be described in more detail with reference to the drawings.

Figure 2:
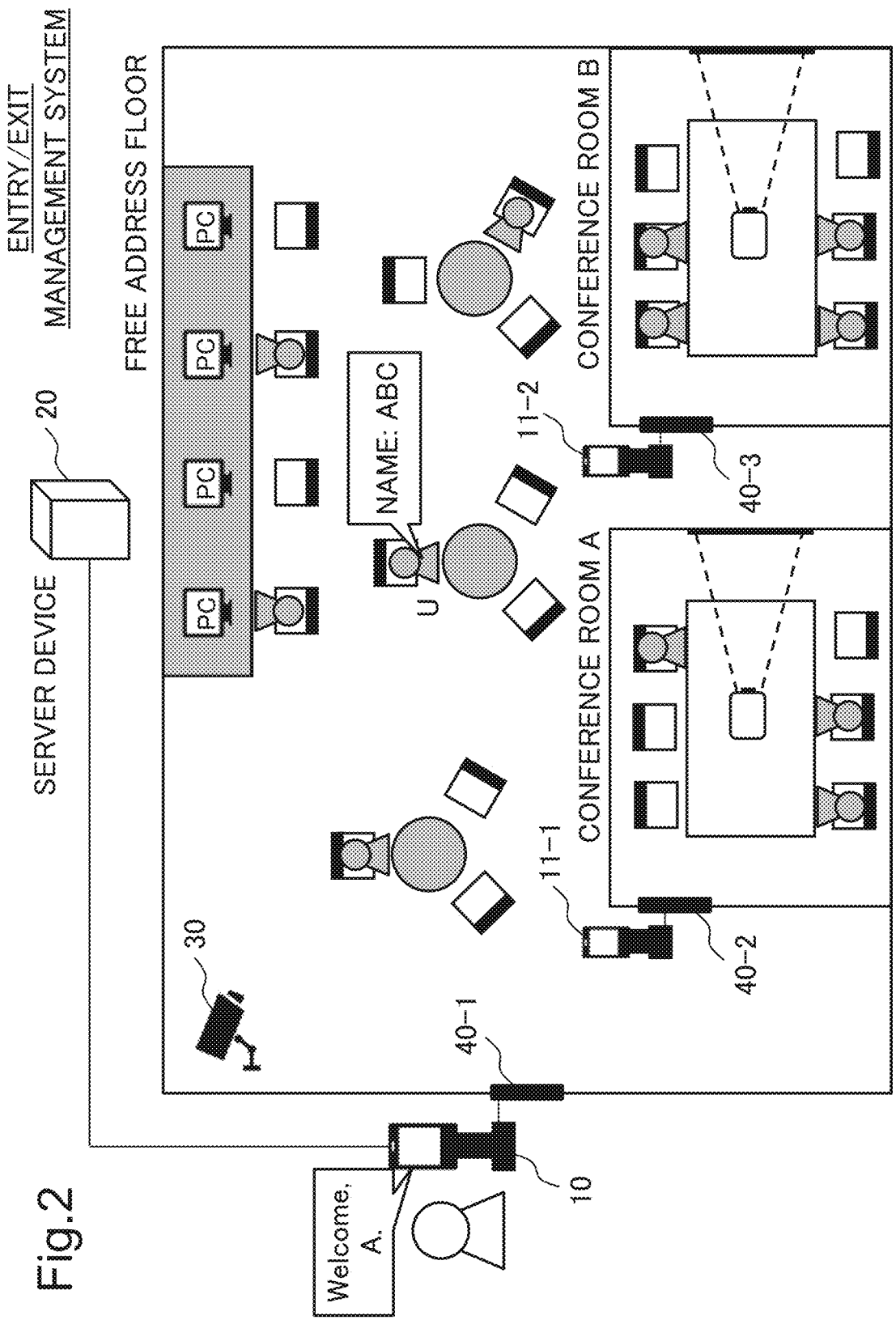
FIG. 2 is a diagram illustrating an example of a schematic configuration of an entry/exit management system according to a first example embodiment.

FIG. 2 is a diagram illustrating an example of a schematic configuration of the entry/exit management system according to the first example embodiment. Referring to FIG. 2, the entry/exit management system includes an authentication terminal 10, conference room terminals 11-1 and 11-2, and a server device 20. The entry/exit management system according to the first example embodiment manages entry/exit related to a user of a free address floor (hereinafter, it is simply referred to as a floor).

At least one or more camera devices 30 are installed on the floor illustrated in FIG. 2. The camera device 30 is installed in such a way as to overlook the entire floor. Although FIG. 2 illustrates one camera device 30, in a case where a plurality of camera devices 30 is required to obtain an image of the entire floor in a bird's eye view, the plurality of camera devices 30 is installed to achieve the object.

In the following description, when there is no particular reason to distinguish the conference room terminals 11-1 and 11-2, they are simply referred to as a "conference room terminal 11". Similarly, for other components, reference numerals on the left side separated by hyphens are used to represent the components.

The devices illustrated in FIG. 2 are connected to each other. For example, the authentication terminal 10 and the server device 20 are connected by wired or wireless communication means, and are configured to be able to communicate with each other. Although FIG. 2 illustrates a connection line between the authentication terminal 10 and the server device 20, other components (the conference room terminal 11, the camera device 30) are also connected to the server device 20. Further, a stationary personal computer (PC) installed in the floor is also connected to the server device 20.

The server device 20 may be installed in the same building as the free address floor, or may be installed on a network (on a cloud).

The authentication terminal 10 is a terminal installed at the entrance of the free address floor. The authentication terminal 10 is connected to a gate 40-1. When the authentication of the visitor is successful, the authentication terminal 10 opens the gate 40-1 and permits the visitor to use the free address floor.

The conference room terminal 11 is a terminal installed at an entrance of a conference room in a floor. When the authentication of the user (the attendee in the floor) who has reserved the conference room is successful, the conference room terminal 11 opens the associated gate 40 in such a way that the user can use the conference room. The conference room terminal 11 can display information on a conference being held in addition to the authentication function (opening/closing control of the gate 40). For example, the conference room terminal 11 displays names of participants of the conference, and displays purposes, agenda, and the like of the conference.

The server device 20 is a device that manages users in the floor. The server device 20 executes authentication processing using the biological information (for example, biological information on the face) of the visitor acquired via the authentication terminal 10. The server device 20 notifies the authentication terminal 10 of the result of the authentication process.

The server device 20 manages the position of the user (attendee or stayer in the floor) in the floor. The server device 20 grasps the position of each user by an arbitrary means in real time.

For example, the server device 20 may acquire position information from a terminal (terminal such as a smartphone) possessed by the user to grasp the position of the user. In this case, the terminal carried by the user may receive a GPS signal from a global positioning system (GPS) satellite, perform positioning, and generate position information including the latitude, longitude, and altitude of the terminal.

The server device 20 may detect the position of the user by analyzing the image obtained from the camera device 30. In the first example embodiment, a case where the server device 20 grasps the position of the user by analyzing the image obtained from the camera device 30 will be described.

A visitor (a user who intends to enter the free address floor) may want to meet with (meeting, conference) a user on the floor. In this case, after the authentication by the authentication terminal 10 succeeds, the visitor inputs information about a person (hereinafter, it is described as a meeting desired person) whom the visitor wants to meet with.

Figure 3:
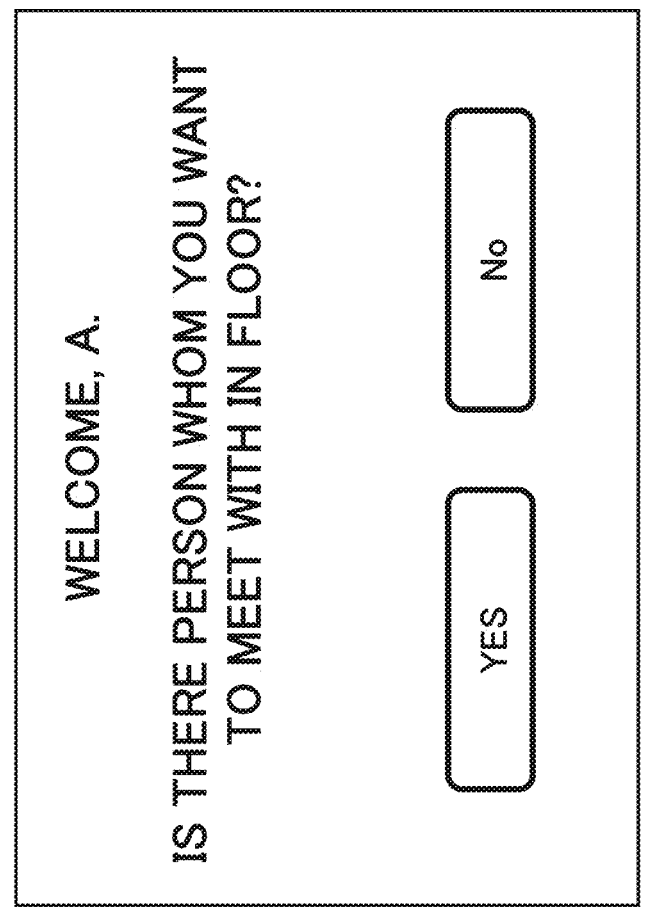
FIG. 3 is a diagram illustrating an example of display by an authentication terminal according to the first example embodiment.

For example, the authentication terminal 10 uses a graphical user interface (GUI) as illustrated in FIG. 3 to confirm whether the visitor has an intention (an intention that the visitor desires to meet with another user). When recognizing that the visitor has an intention to meet with another user, the authentication terminal 10 accepts the visitor's operation using a GUI as illustrated in FIG. 4.

Figure 4:
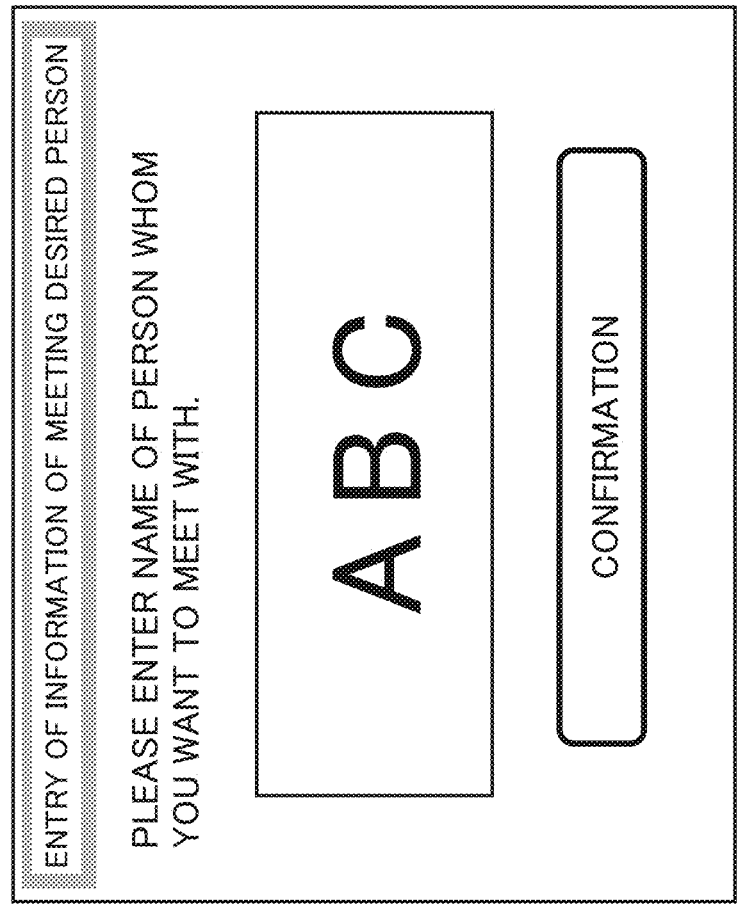
FIG. 4 is a diagram illustrating an example of display by the authentication terminal according to the first example embodiment.

For example, the visitor who views the screen as illustrated in FIG. 4 inputs the name of a person whom the visitor wishes to meet with in the character input area. The visitor presses the confirm button after inputting the name of the meeting desired person. The authentication terminal 10 transmits the name of the meeting desired person acquired by the GUI as illustrated in FIG. 4 to the server device 20.

The authentication terminal 10 and the conference room terminal 11 include an input/output device in which a liquid crystal panel and a touch panel are integrated, and perform display related to a GUI using the input/output device to receive a user's operation.

The server device 20 identifies the position of the meeting desired person based on the information (name of the meeting desired person) acquired from the authentication terminal 10, and notifies the authentication terminal 10 of the identified position.

Figure 5:
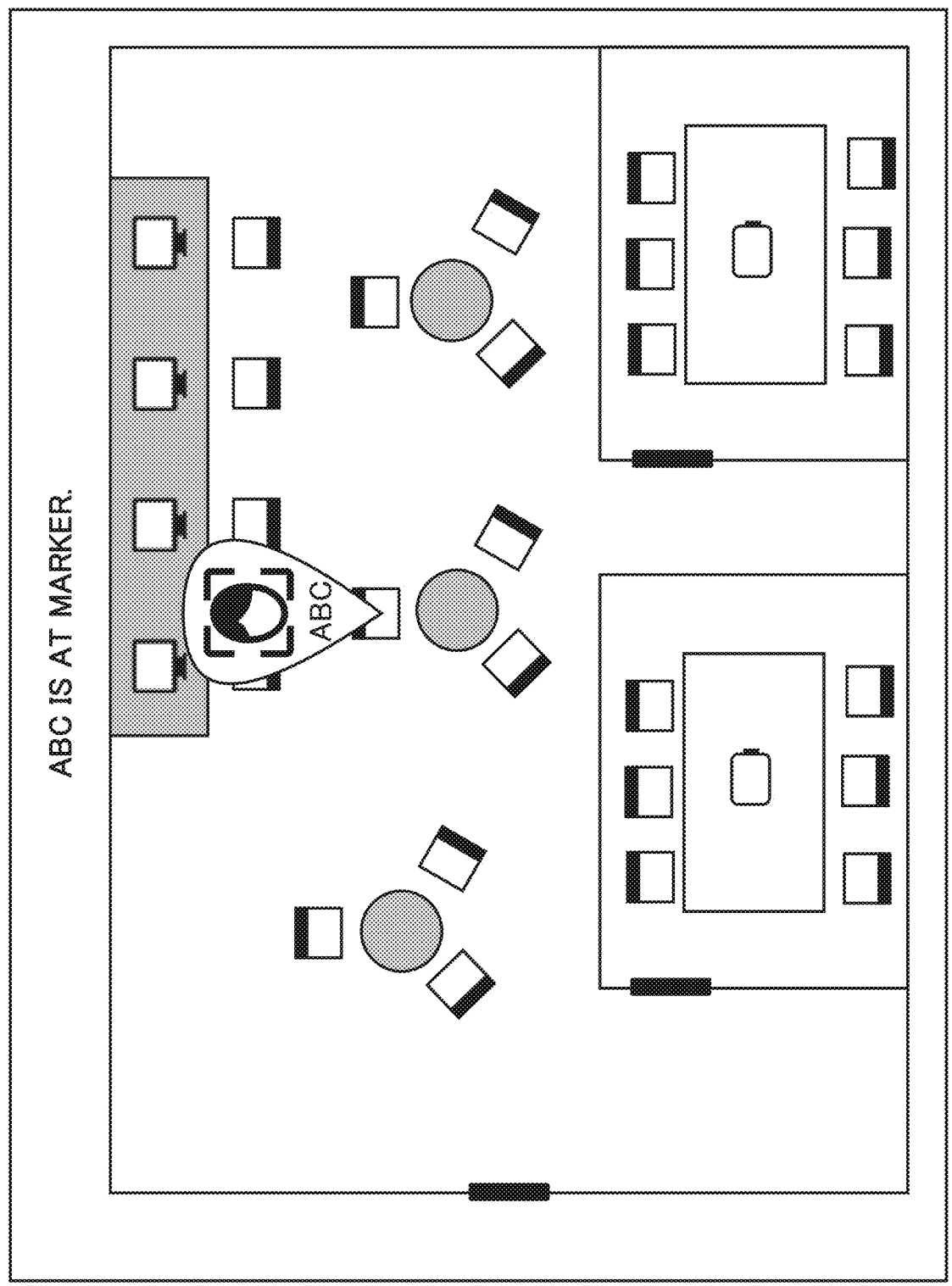
FIG. 5 is a diagram illustrating an example of display by the authentication terminal according to the first example embodiment.

The authentication terminal 10 displays the position of the meeting desired person (the position of the meeting desired person in the free address floor) using the acquired information. For example, the authentication terminal 10 displays a screen as illustrated in FIG. 5. For example, as illustrated in FIG. 5, the authentication terminal 10 displays map information imitating a free address floor. Then, the authentication terminal 10 identifies the position of the meeting desired person by a tear-shaped marker (marker in which the upper and lower sides of the teardrop shape are inverted), and displays the face image, the name, and the like of the meeting desired person in the marker.

The visitor viewing the screen as illustrated in FIG. 5 can recognize that the meeting desired person is seated on the round table in the center of the floor. The visitor can easily grasp the location of the target person, and does not need to search for a meeting desired person.

As described above, when the visitor desires to meet with a person in the floor, the authentication terminal 10 requests (requests) the server device 20 to search for the position of the person. In the following description, a request transmitted from the authentication terminal 10 to the server device 20 is referred to as a "search request". Information identifying the meeting desired person such as the name of the meeting desired person is described as "meeting desired person information". The position information about the meeting desired person included in the response (response to the search request) transmitted from the server device 20 to the authentication terminal 10 is described as "interview desiring person position information".

<Preliminary Preparation>

Here, in order to achieve the entry/exit management of the user by the server device 20, the system user (user of the free address floor) is required to make a preliminary preparation. The preliminary preparation will be described below.

The user stores attribute values such as biological information and profile about the user in the system. Specifically, the user inputs the face image to the server device 20. The user inputs his/her profile (for example, attribute information such as a name, an employee number, a place of employment, a department to which the user belongs, a title, and a contact address) to the server device 20.

Any method can be used to input information such as the biological information and the profile. For example, the user captures his/her face image using a terminal such as a smartphone. Further, the user generates a text file or the like in which the profile is described using the terminal. The user operates the terminal to transmit the information (face image, profile) to the server device 20. Alternatively, the user may input necessary information to the server device 20 using an external storage device such as a Universal Serial Bus (USB) in which the information is stored.

Alternatively, the server device 20 may have a function as a web (WEB) server, and the user may input necessary information by a form provided by the server. Alternatively, a terminal for inputting the information may be installed outside the floor, and the user may input necessary information from the terminal to the server device 20. Alternatively, the user may input necessary information from the authentication terminal 10 to the server device 20.

The server device 20 updates the database that manages the system user using the acquired user information (biological information, profiles, etc.). Details regarding the update of the database will be described later, but the server device 20 updates the database by the following operation. In the following description, a database for managing users using the system of the present disclosure will be referred to as a "user database".

When the person related to the acquired user information is a new user not stored in the user database, the server device 20 assigns an identifier (ID) to the new user. The server device 20 generates a feature amount that characterizes the acquired face image.

The server device 20 adds an entry including the ID assigned to the new user, the feature amount generated from the face image, the face image of the user, the profile, and the like to the user database. When the server device 20 stores the user information, the user can enter the free address floor.

Next, details of each device included in the entry/exit management system according to the first example embodiment will be described.

[Server Device]

Figure 6:
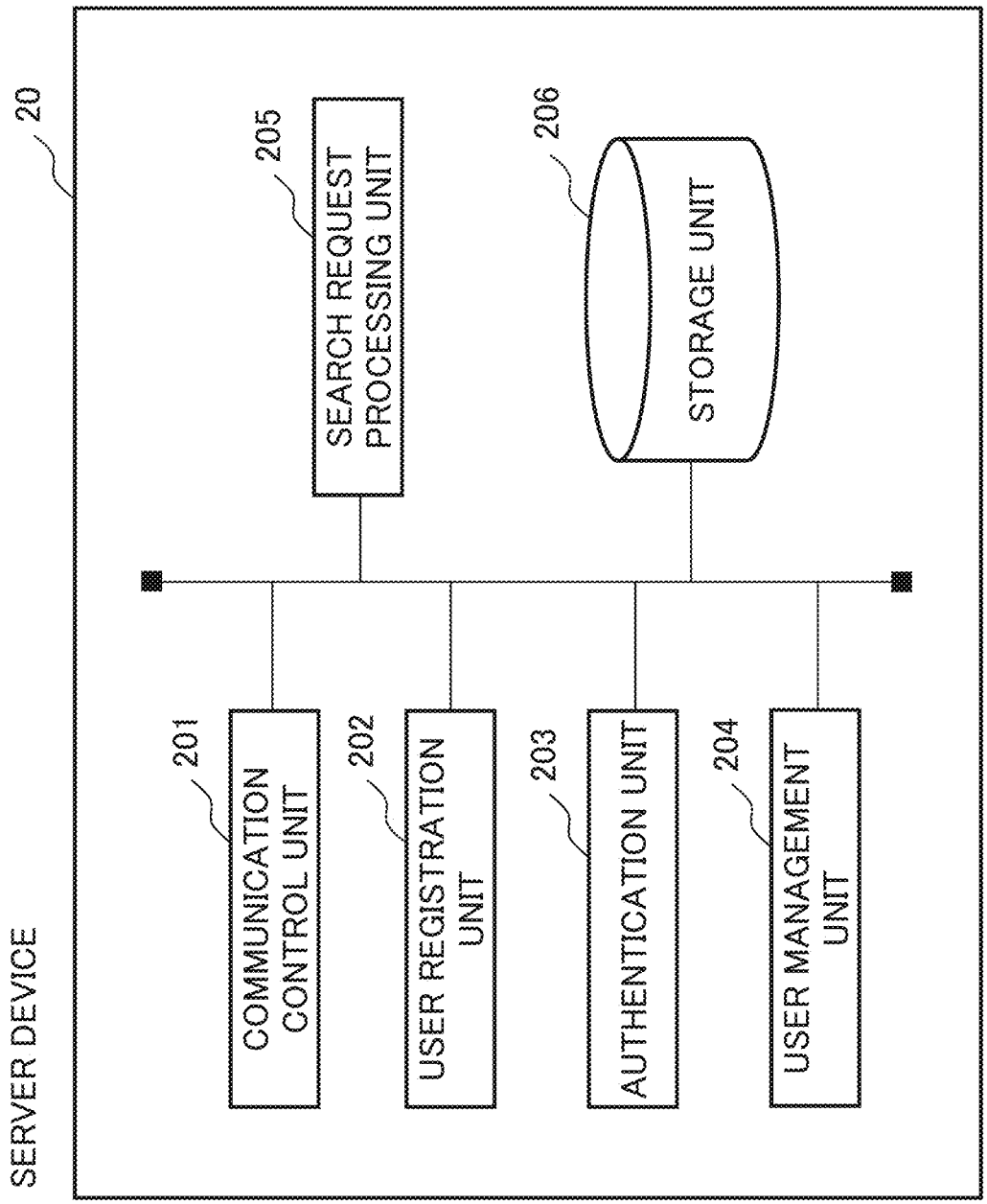
FIG. 6 is a diagram illustrating an example of a processing configuration of a server device according to the first example embodiment.

FIG. 6 is a diagram illustrating an example of a processing configuration (processing module) of the server device 20 according to the first example embodiment. Referring to FIG. 6, the server device 20 includes a communication control unit 201, a user registration unit 202, an authentication unit 203, a user management unit 204, a search request processing unit 205, and a storage unit 206.

The communication control unit 201 is a unit that controls communication with other devices. Specifically, the communication control unit 201 receives data (packet) from the authentication terminal 10. The communication control unit 201 transmits data to the authentication terminal 10. The communication control unit 201 delivers data received from another device to another processing module. The communication control unit 201 transmits data acquired from another processing module to another device. In this manner, the other processing modules transmit and receive data to and from other devices via the communication control unit 201.

Figure 7:
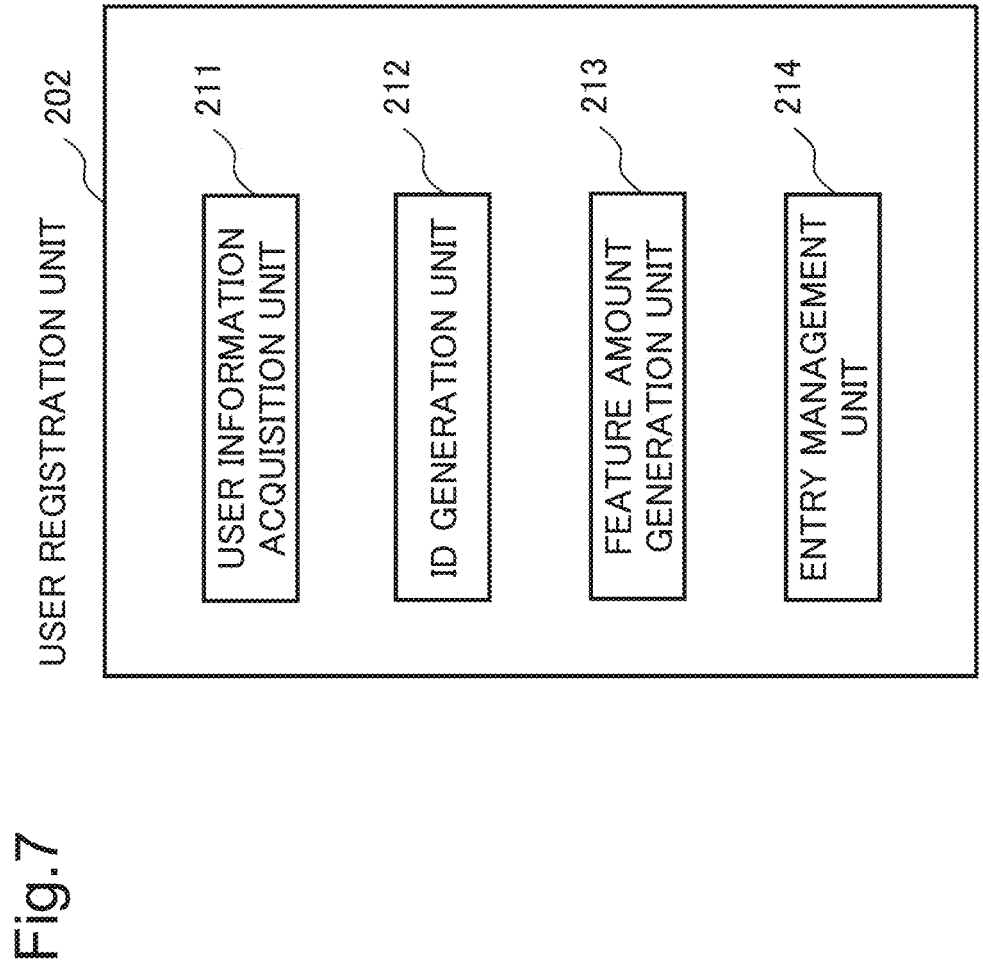
FIG. 7 is a diagram illustrating an example of a processing configuration of a user registration unit according to the first example embodiment.

The user registration unit 202 is a unit that achieves the system user registration described above. The user registration unit 202 includes a plurality of submodules. FIG. 7 is a diagram illustrating an example of a processing configuration of the user registration unit 202. Referring to FIG. 7, the user registration unit 202 includes a user information acquisition unit 211, an ID generation unit 212, a feature amount generation unit 213, and an entry management unit 214.

The user information acquisition unit 211 is a unit that acquires the user information described above. The user information acquisition unit 211 acquires biological information and profiles of a plurality of users who uses the entry/exit management system. More specifically, the user information acquisition unit 211 acquires biological information (for example, a face image) and a profile (for example, a name, a department to which the user belongs, and the like) of the system user. The system user may input the information from his/her terminal to the server device 20, or may operate the authentication terminal 10 to input the information.

The user information acquisition unit 211 may provide a GUI or a form for inputting the information. For example, the user information acquisition unit 211 displays an information input form as illustrated in FIG. 8 on the terminal operated by the user.

The system user inputs the information illustrated in FIG. 8. The system user selects whether to newly store the user in the system or to update the already stored information. After inputting all the information, the system user presses the "transmit" button, and inputs the biological information and the profile to the server device 20.

Figure 9:
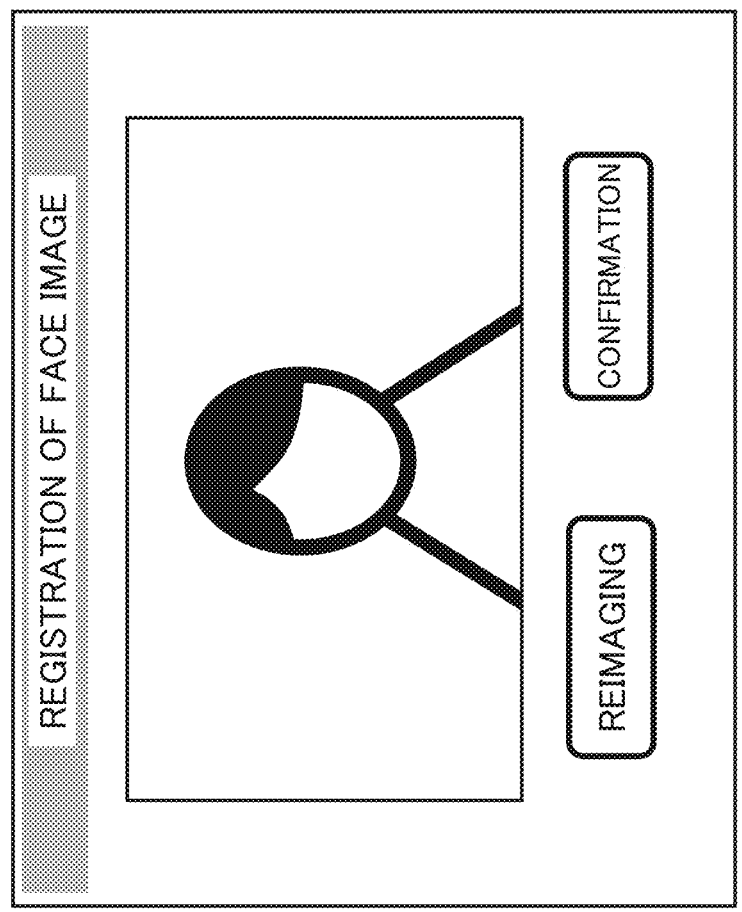
FIG. 9 is a diagram illustrating an example of display by the authentication terminal according to the first example embodiment.

When the user inputs the user information using the authentication terminal 10, the authentication terminal 10 acquires the face image of the user using the interface as illustrated in FIG. 9. When the face image is successfully acquired, the authentication terminal 10 provides the user with an interface for inputting the profile.

The user information acquisition unit 211 stores the acquired user information in the storage unit 206.

The ID generation unit 212 is a unit that generates an ID to be assigned to the system user. When the user information input by the system user is information related to new registration, the ID generation unit 212 generates an ID for identifying the new user. For example, the ID generation unit 212 may calculate a hash value of the acquired user information (face image, profile) and use the hash value as an ID to be assigned to the user. Alternatively, the ID generation unit 212 may assign a unique value each time user registration is performed and use the assigned value as the ID. In the following description, an ID (an ID for identifying a system user) generated by the ID generation unit 212 is referred to as a "user ID".

The feature amount generation unit 213 is a unit that generates a feature amount (a feature vector including a plurality of feature amounts) characterizing the face image from the face image included in the user information. Specifically, the feature amount generation unit 213 extracts feature points from the acquired face image. An existing technique can be used for the feature point extraction processing, and thus a detailed description thereof will be omitted. For example, the feature amount generation unit 213 extracts eyes, a nose, a mouth, and the like as feature points from the face image. Thereafter, the feature amount generation unit 213 calculates the position of each feature point and the distance between the feature points as a feature amount, and generates a feature vector (vector information characterizing the face image) including a plurality of feature amounts.

The entry management unit 214 is a unit that manages an entry of the user database. When storing a new user in the database, the entry management unit 214 adds an entry including the user ID generated by the ID generation unit 212, the feature amount generated by the feature amount generation unit 213, the face image, and the profile acquired from the user to the user database.

When updating the information about the user already stored in the user database, the entry management unit 214 identifies an entry to be subjected to the information update based on the employee number or the like, and updates the user database using the acquired user information. At this time, the entry management unit 214 may update a difference between the acquired user information and the information stored in the database, or may overwrite each item of the database with the acquired user information. Similarly, regarding the feature amount, the entry management unit 214 may update the database when there is a difference in the generated feature amount, or may overwrite the existing feature amount with the newly generated feature amount.

The user registration unit 202 operates to construct a user database (database in which user ID for identifying system user, biological information, and profile are stored in association with each other) as illustrated in FIG. 10. It goes without saying that the content stored in the user database illustrated in FIG. 10 is an example and is not intended to limit the information stored in the user database.

The description returns to FIG. 6. The authentication unit 203 is a unit that performs authentication processing of a visitor who has visited the free address floor. The authentication unit 203 acquires an authentication request from the authentication terminal 10. Since the authentication request includes the face image of the visitor (person to be authenticated), the authentication unit 203 extracts the face image from the authentication request. The authentication unit 203 calculates a feature amount from the acquired face image.

The authentication unit 203 sets the feature amount calculated based on the face image acquired from the authentication terminal 10 for the collation target, and performs the collation processing with the feature amount stored in the user database. More specifically, the authentication unit 203 sets the calculated feature amount (feature vector) for a collation target, and executes one-to-N (N is a positive integer, and the same applies hereinafter) collation with a plurality of feature vectors stored in the user database.

The authentication unit 203 calculates similarity between the feature amount of the collation target and each of the plurality of feature amounts on the registration side. A chi-square distance, a Euclidean distance, or the like can be used as the similarity. The similarity is lower as the distance is longer, and the similarity is higher as the distance is shorter.

The authentication unit 203 determines that the authentication of the collation target is successful when the similarity with the feature amount of the collation target is greater than or equal to a predetermined value among the plurality of feature amounts stored in the user database and there is the feature amount having the highest similarity. The authentication unit 203 transmits an authentication result (authentication succeeded, authentication failed) to the authentication terminal 10 as a response to the collation request.

The authentication unit 203 reads the user ID related to the person who has been successfully authenticated from the user database. The authentication unit 203 delivers the read user ID to the user management unit 204.

The user management unit 204 is a unit that manages a user (attendee or stayer in the floor) in the free address floor. The user management unit 204 manages the attendee using the user ID acquired from the authentication unit 203. Specifically, the user management unit 204 manages the user ID and the position information about the person related to the user ID in association with each other.

The user management unit 204 calculates the position of the attendee in real time. As described above, the user management unit 204 calculates the position of the attendee by an arbitrary means. In the first example embodiment, the user management unit 204 analyzes images obtained from the camera device 30 disposed at various places on the free address floor to calculate the position of the attendee.

For example, the user management unit 204 extracts a face region (face image) from the image data acquired from the camera device 30. The user management unit 204 calculates a feature amount from the extracted face image, and identifies the user ID of the person appearing in the image data by collation processing using the user database. Further, the user management unit 204 converts the coordinates (for example, coordinates of a coordinate system with the lower left of the image data as an origin) of the face image in the image data into coordinates in the floor (coordinates in a coordinate system with an entrance as the origin). For example, the user management unit 204 calculates the position information about the user by performing the conversion using a conversion table prepared in advance. The user management unit 204 updates the position information about the identified user ID with the position information calculated using the image data. Since the sizes of the faces of the persons can be regarded as the same to some extent, the distance between the user and the camera device 30 can be estimated from the size of the face. Therefore, the user management unit 204 can estimate the position of the user by preparing the conversion table for each size of the extracted face region.

Alternatively, the free address floor may be divided into squares, and the camera device 30 may be assigned to each of the divided small regions. In this case, the user management unit 204 may estimate the position of the user by referring to information (for example, table information) in which the imaging range and the position of each camera device 30 are associated with each other and analyzing the image data obtained from each camera device 30. That is, the user management unit 204 may estimate the position of the person related to the face image from the position of the camera device 20 that has captured the image including the face image. That is, when a person appears in the image data obtained from the camera device 30, the user management unit 204 determines that the person exists in the imaging range of the camera device 30 and estimates the position.

Alternatively, the user management unit 204 may calculate the position information about the attendee using a stereo camera or the like capable of calculating the depth direction as the camera device 30. In this case, the user management unit 204 analyzes the two pieces of image data, and calculates the position (coordinates) and the direction of the user based on the position of the camera device 30. Thereafter, the user management unit 204 may calculate the position information about the user by combining the position of or the camera device 30 with the position of the user (adding the relative position of the user to the absolute position of the camera device 30).

Alternatively, as described above, the user management unit 204 may acquire the position information from the terminal possessed by the user. The terminal of the user may generate the position information using the GPS, or may generate the position information based on the strength of the radio wave received from the wireless access point such as Wi-Fi (Wireless Fidelity).

In a case where there is a blind spot or the like of the camera device 30, the user management unit 204 may calculate the position of the user from address information or the like of a personal computer (PC) used by the user. For example, address information about a PC and position information where the PC is installed may be stored in association with each other, an attendee may be identified from login information (information for identifying a user who uses the PC) obtained from the PC, and the position information may be calculated.

The user management unit 204 manages the user ID, the date and time when the user enters the floor, and the position information about the user in association with each other. Specifically, the user management unit 204 manages the attendee using an attendee management database having a field for storing at least the above three pieces of information. For example, the user management unit 204 manages the attendee using an attendee management database as illustrated in FIG. 11. As illustrated in FIG. 11, the attendee management database is a database that stores at least a user ID related to an attendee in a restricted area (free address floor) where entry/exit is restricted and position information about the attendee in association with each other.

The attendee management database illustrated in FIG. 11 is an example, and the state (work state) of the attendee may be managed in addition to the entry date and time and the position information. For example, when an attendee is in a meeting, the state of the attendee may be set to "in a meeting", and when the attendee executes business on a round table or the like, the state of the attendee may be set to "normal work" (see FIG. 12). Whether the attendee is "in a meeting" may be determined according to the operation of the conference room terminal 11 (whether the conference room terminal 11 permits the entering into the conference room). Alternatively, whether the attendee is in a meeting may be determined according to the position of the attendee.

The user management unit 204 adds a new entry to the attendee management database immediately after the user enters the free address floor. When the attendee exits from the floor, the user management unit 204 deletes the associated entry from the attendee management database. The user management unit 204 detects entry/exit of the user using an image obtained from the camera device 30.

The description returns to FIG. 6. The search request processing unit 205 is a unit that processes the "search request" received from the authentication terminal 10. The search request processing unit 205 transmits the position information about the meeting desired person whom the visitor desires to meet with to the authentication terminal 10. In response to receiving the search request for the position of the meeting desired person from the authentication terminal 10, the search request processing unit 205 transmits "meeting desired person position information" to the authentication terminal 10.

The search request processing unit 205 extracts information (meeting desired person information; for example, the name) identifying the meeting desired person from the search request. The search request processing unit 205 searches the user database using the extracted information as a search key, and identifies the related user ID.

The search request processing unit 205 refers to the attendee management database and acquires position information (coordinate information in the floor) related to the identified user ID.

The search request processing unit 205 transmits a search result including the acquired position information, the name of the meeting desired person as the search target, the face image, and the like to the authentication terminal 10.

For example, in the example of FIG. 2, when a visitor wants to know the position of the attendee U, a search request including the name (ABC) of the attendee U is transmitted to the server device 20. The search request processing unit 205 acquires the related user ID from the user database based on the name (ABC) included in the search request. The search request processing unit 205 refers to the attendee management database and acquires the position information about the person related to the user ID read from the user database. The search request processing unit 205 transmits the acquired position information, and the name (ABC) and the face image of the search target person to the authentication terminal 10. The authentication terminal 10 displays a screen indicating the position of the meeting desired person using the acquired search result (name, face image, and position information). For example, the authentication terminal 10 displays a screen as illustrated in FIG. 5.

There may be a case where users having the same family name and same first name are stored in the user database. In this case, since the search request processing unit 205 cannot determine which person of the plurality of persons with the same family name and same first name is the meeting desired person, the search request processing unit transmits search results (name, face image, and position information) for the plurality of persons to the authentication terminal 10. The authentication terminal 10 may display the search result for each of the plurality of persons. In this case, the visitor may specify the meeting desired person based on the displayed face image. Alternatively, the search request processing unit 205 may transmit the name and the position information to the authentication terminal 10 when there is one person related to the acquired name (person stored in the database), and may transmit the face image in addition to the name and the position information to the authentication terminal 10 when there is a plurality of persons related thereto. That is, the search request processing unit 205 may change the content to be transmitted to the authentication terminal 10 according to the acquired information on the meeting desired person and the result obtained from the user database.

The storage unit 206 is a unit that stores information necessary for the operation of the server device 20.

[Authentication Terminal]

The authentication terminal 10 is a terminal that manages entry to a restricted area (free address floor). When an authentication using the biological information recorded in the user database is successful, the authentication terminal 10 permits a successfully authenticated user to enter the restricted area.

Figure 13:
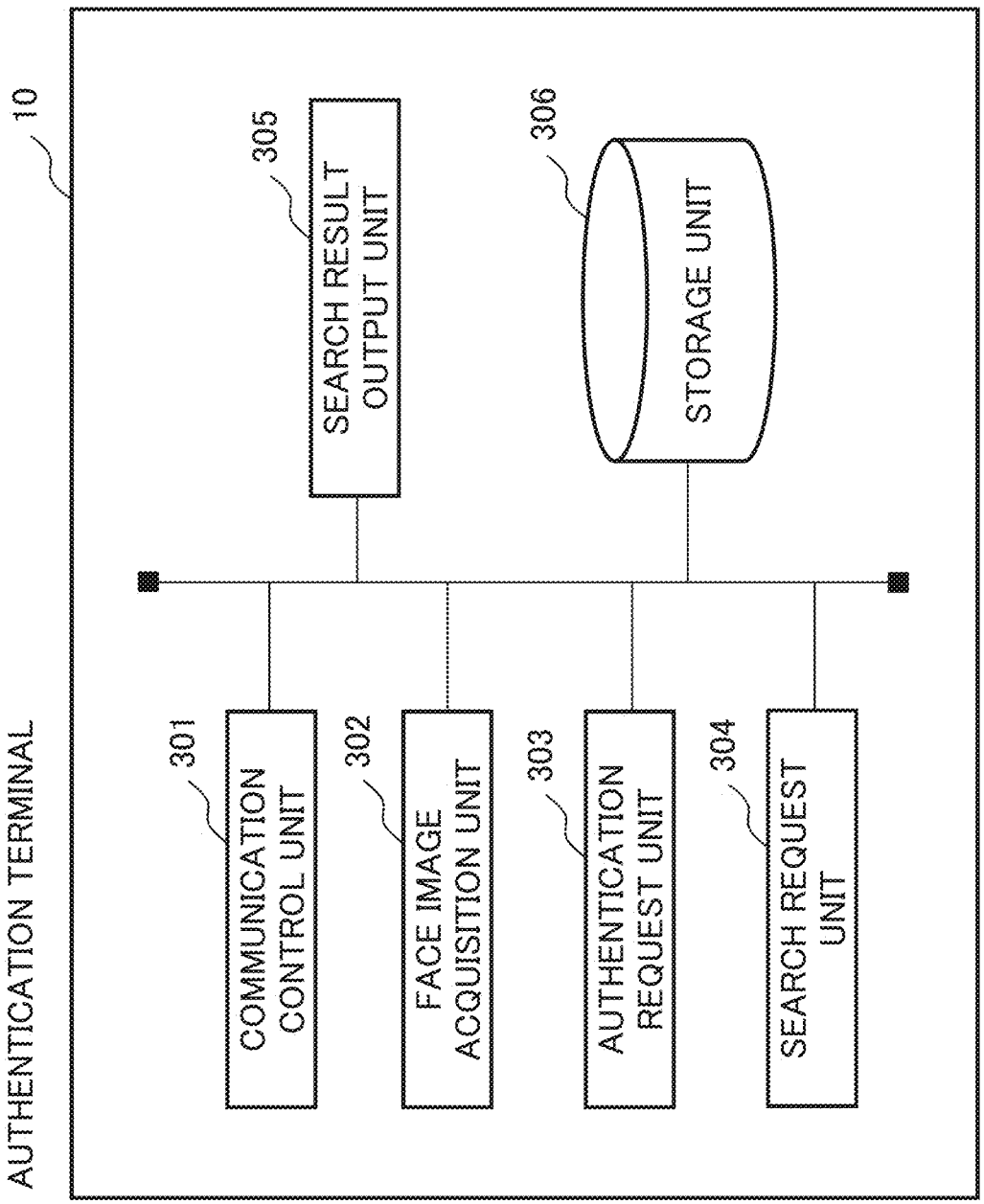
FIG. 13 is a diagram illustrating an example of a processing configuration of the authentication terminal according to the first example embodiment.

FIG. 13 is a diagram illustrating an example of a processing configuration (processing module) of the authentication terminal 10. Referring to FIG. 13, the authentication terminal 10 includes a communication control unit 301, a face image acquisition unit 302, an authentication request unit 303, a search request unit 304, a search result output unit 305, and a storage unit 306.

The communication control unit 301 is a unit that controls communication with other devices. Specifically, the communication control unit 301 receives data (packet) from the server device 20. The communication control unit 301 transmits data to the server device 20. The communication control unit 301 delivers data received from another device to another processing module. The communication control unit 301 transmits data acquired from another processing module to another device. In this manner, the other processing modules transmit and receive data to and from other devices via the communication control unit 301.

The face image acquisition unit 302 is a unit that controls a camera device (a camera device included in the authentication terminal 10) and acquires a face image (biological information) of a visitor in front of the camera device. The face image acquisition unit 302 images the front of the face image acquisition unit periodically or at a predetermined timing. The face image acquisition unit 302 determines whether a face image of a person is included in the acquired image, and extracts the face image from the acquired image data when the face image is included.

Since an existing technology can be used for the face image detection processing and the face image extraction processing by the face image acquisition unit 302, detailed description thereof will be omitted. For example, the face image acquisition unit 302 may extract a face image (face region) from image data by using a learning model learned by a convolutional neural network (CNN). Alternatively, the face image acquisition unit 302 may extract the face image using a method such as template matching.

The face image acquisition unit 302 delivers the extracted face image to the authentication request unit 303.

The authentication request unit 303 is a unit that requests the server device 20 to authenticate a visitor in front of the camera device. The authentication request unit 303 generates an authentication request including the acquired face image to transmit the authentication request to the server device 20.

The authentication request unit 303 receives a response (authentication succeeded, authentication failed) to the authentication request from the server device 20.

When the authentication result is "authentication failed", the authentication request unit 303 notifies the visitor of the fact. At this time, it is preferable that the authentication request unit 303 also make notification of the contact address and the like at the time of authentication failure and the like. For example, the authentication request unit 303 displays the fact that the authentication has failed, the telephone number of the contact address, and the like on a liquid crystal panel or the like.

When the authentication result is "authentication succeeded", the authentication request unit 303 notifies the search request unit 304 of the fact.

The search request unit 304 is a unit that requests the server device 20 to search for the meeting desired person. The search request unit 304 performs display for inputting an intention of the visitor as to whether to search for the meeting desired person. For example, the search request unit 304 performs display as illustrated in FIG. 3.

The search request unit 304 opens the gate 40-1 when the visitor does not desire to search for the meeting desired person (when No in FIG. 3 is selected). The search request unit 304 closes the gate 40-1 after the visitor enters the floor. Whether a visitor has entered the floor (whether the visitor has passed through the gate 40-1) is detected by a sensor (a sensor using infrared rays or the like) installed in the gate 40-1, and the authentication terminal 10 is notified of the detection result.

In a case where the visitor desires to search for the meeting desired person (in a case where Yes in FIG. 3 is selected), the search request unit 304 performs display for inputting information about the meeting desired person. For example, the search request unit 304 performs display as illustrated in FIG. 4 (provides a GUI).

The search request unit 304 generates a "search request" including the information (meeting desired person information; for example, the name or the like of the meeting desired person) acquired via the GUI. The search request unit 304 transmits the generated search request to the server device 20.

The search request unit 304 acquires a response to the request from the server device 20. The search request unit 304 delivers the acquired response to the search result output unit 305.

The search result output unit 305 is a unit that outputs information about the search result acquired from the server device 20. Specifically, the search result output unit 305 outputs information about the position of the meeting desired person. The search result output unit 305 displays, for example, a screen as illustrated in FIG. 5 on the display by using the response (name, face image, and position information about the meeting desired person) acquired from the server device 20.

The administrator or the like inputs information necessary for performing the display illustrated in FIG. 5 to the authentication terminal 10 in advance. Specifically, the administrator or the like inputs information about the layout of the free address floor or the like and information about the coordinate system to the authentication terminal 10 in advance. For example, the administrator or the like stores a conversion formula or the like for converting the position information (coordinate information) acquired from the server device 20 into coordinates on the map in the authentication terminal 10.

The display illustrated in FIG. 5 is an example and is not intended to limit the output format, the output form, and the like of the search result output unit 305. For example, the search result output unit 305 may transmit the search result to an email address or the like of the visitor. Alternatively, the search result output unit 305 may notify the visitor of the position information about the meeting desired person by replacing it with a brief expression indicating the position information. For example, in the example of FIG. 5, a display or a voice such as "ABC is seated on the center round table" may be output.

The storage unit 306 is a unit that stores information necessary for the operation of the authentication terminal 10.

[Operation of Entry/Exit Management System]

Next, an operation of the entry/exit management system according to the first example embodiment will be described.

Figure 14:
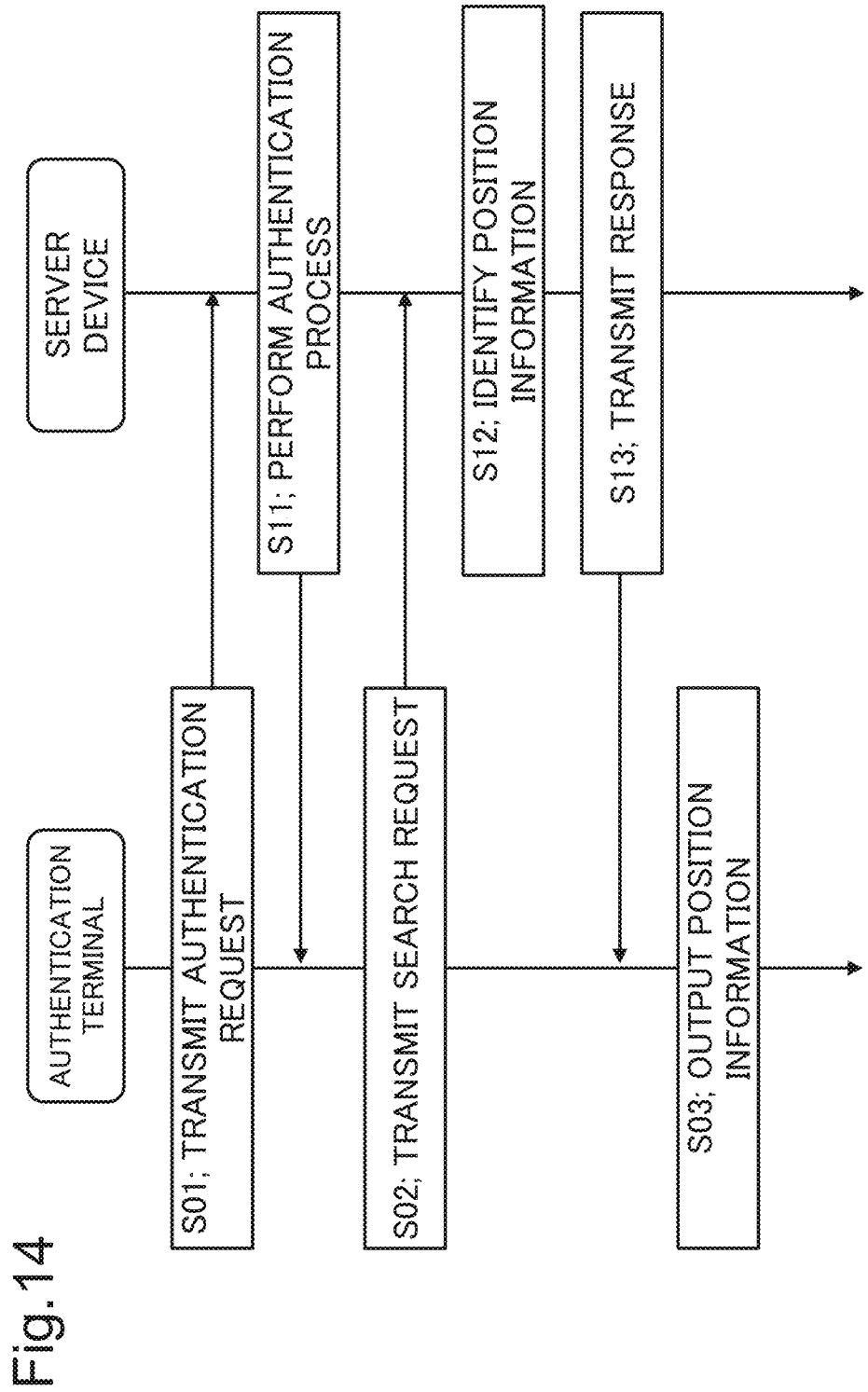
FIG. 14 is a sequence diagram illustrating an example of an operation of the entry/exit management system according to the first example embodiment.

FIG. 14 is a sequence diagram illustrating an example of the operation of the entry/exit management system according to the first example embodiment. FIG. 14 is a sequence diagram illustrating an example of a system operation in a case where the visitor desires to search for the meeting desired person. It is assumed that the system user is stored in advance prior to the operation of FIG. 14.

When the visitor is located in front of the authentication terminal 10, the authentication terminal 10 obtains a face image of the visitor. The authentication terminal 10 transmits an authentication request including the face image to the server device 20 (step S01).

The server device 20 executes authentication processing (collation processing using the feature amount stored in the user database) using the acquired face image (step S11). The server device 20 transmits the result of the authentication process (authentication succeeded, authentication failed) to the authentication terminal 10.

In a case where the visitor desires to search for the meeting desired person, the authentication terminal 10 transmits a search request including the name and the like of the meeting desired person to the server device 20 (step S02).

The server device 20 extracts the meeting desired person information from the search request, and identifies the position information about the meeting desired person using the user database and the attendee management database (step S12).

The server device 20 transmits a response (response to the search request) including the identified position information to the authentication terminal 10 (step S13).

The authentication terminal 10 outputs information that clearly indicates the place of the meeting desired person using the acquired position information (outputs the position information about the meeting desired person; step S03).

As described above, in a case where the server device 20 according to the first example embodiment receives, from the authentication terminal 10, a search request including the meeting desired person information (for example, the name) that is information for identifying the meeting desired person, the server device identifies the related user ID from the user database using the meeting desired person information. The server device 20 acquires the position information about the meeting desired person from the entry administrator database using the identified user ID. The position information about the meeting desired person is transmitted to the authentication terminal 10, and is displayed in such a way that the visitor can grasp the position of the meeting desired person. As a result, the visitor can easily grasp the position of the person whom the visitor wants to meet with.

Second Example Embodiment

Next, the second example embodiment will be described in detail with reference to the drawings.

In the first example embodiment, the case where the authentication terminal 10 transmits the information about the meeting desired person to the server device 20 is described. In the second example embodiment, a case where information about a candidate of a meeting desired person is transmitted from the server device 20 to the authentication terminal 10 will be described.

In a case where the visitor desires to search for a meeting desired person, the authentication terminal 10 notifies the server device 20 of the request. For example, the authentication terminal 10 transmits a search request (empty search request) not including the meeting desired person information to the server device 20. The empty search request functions as a provision (transmission) request of the meeting desired person candidate from the authentication terminal 10 to the server device 20.

Upon receiving an empty search request (a request for providing a meeting desired person candidate), the server device 20 reads the name of the user ID stored in the entry administrator database from the user database.

The server device 20 transmits the read name (all the names of the users entering the free address floor) to the authentication terminal 10. The server device 20 transmits the list of read names to the authentication terminal 10 as a meeting desired person list (list in which candidates of meeting desired persons are described).

Figure 15:
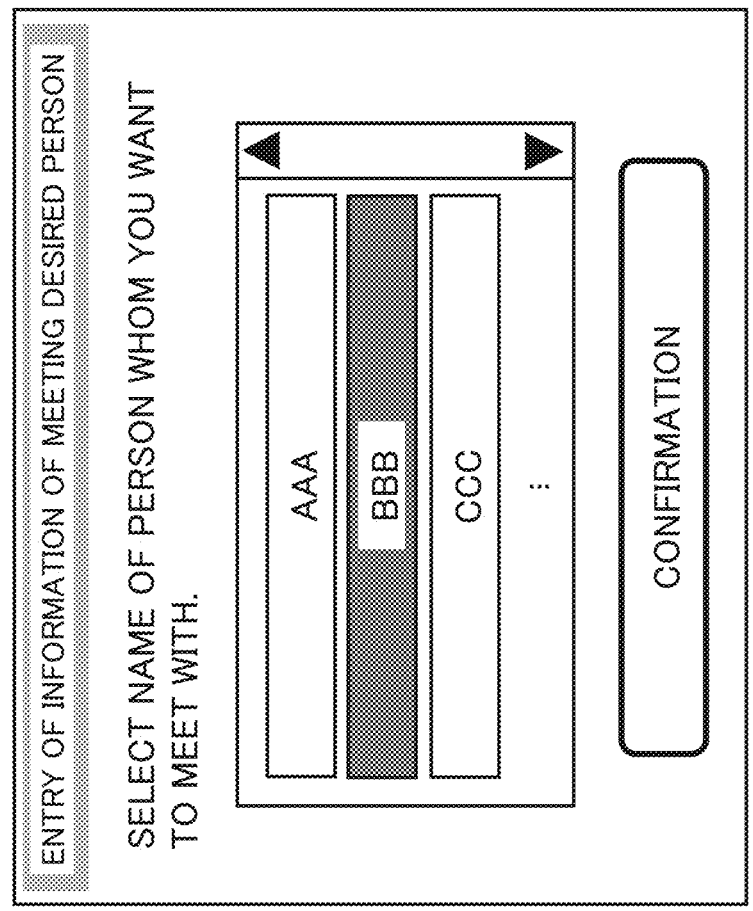
FIG. 15 is a diagram illustrating an example of display by the authentication terminal according to a second example embodiment.

The authentication terminal 10 receives the meeting desired person list and displays a list of the acquired names of the users. For example, the authentication terminal 10 performs display as illustrated in FIG. 15. The visitor selects the name of the meeting desired person according to the display illustrated in FIG. 15, and presses the "confirm button".

The authentication terminal 10 transmits the selected name to the server device 20.

The server device 20 transmits the face image, the position information, and the like related to the selected name to the authentication terminal 10.

The authentication terminal 10 displays the position information about the meeting desired person using the acquired position information (for example, display as illustrated in FIG. 5 is performed).

The configuration of the entry/exit management system according to the second example embodiment can be the same as that of the first example embodiment, and thus the description related to FIG. 2 is omitted. Since the processing configurations of the authentication terminal 10 and the server device 20 according to the second example embodiment can be the same as those of the first example embodiment, the description thereof will be omitted.

The search request unit 304 and the search result output unit 305 of the authentication terminal 10 may implement the operation of the authentication terminal 10 described above. The search request processing unit 205 of the server device 20 may implement the operation of the server device 20 described above.

Modification of Second Example Embodiment

When transmitting all names of the users to the authentication terminal 10, the server device 20 may also transmit the face image and the position information about each person to the authentication terminal 10.

Figure 16:
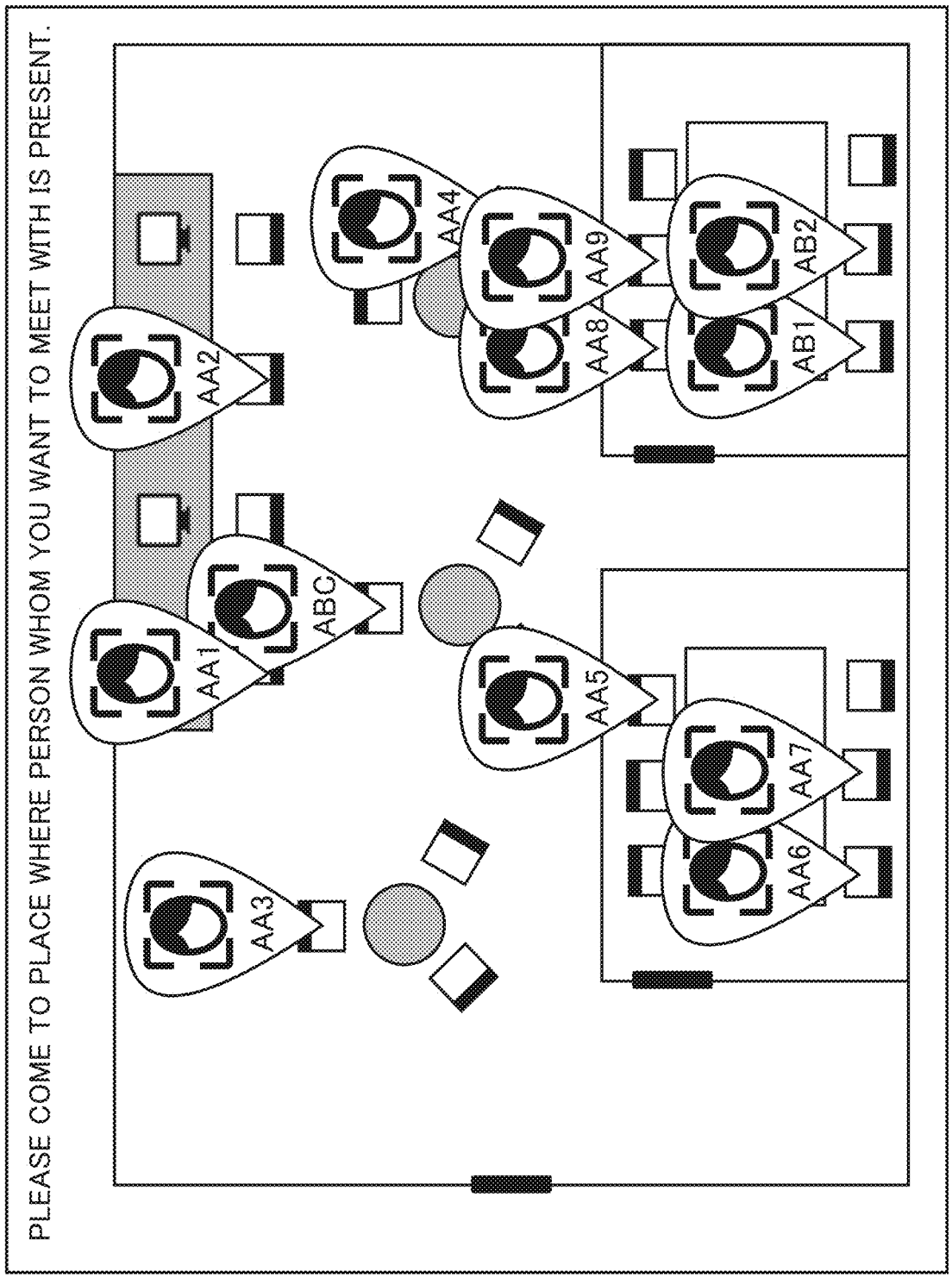
FIG. 16 is a diagram illustrating an example of display by the authentication terminal according to the second example embodiment.

In this case, the authentication terminal 10 may perform the display as illustrated in FIG. 16 instead of the display as illustrated in FIG. 15. The visitor who views the display as illustrated in FIG. 16 can find a target person on the map and go to the place of the person. With such an interface, the visitor can go to the desired person without performing an operation of inputting the name of the meeting desired person.

As described above, the server device 20 according to the second example embodiment receives the search request for the position of the meeting desired person from the authentication terminal 10. The server device 20 that has received the search request transmits, to the authentication terminal 10, a meeting desired person list including information (for example, the name of the attendee) for identifying at least one or more attendees stored in the attendee management database. The server device 20 acquires the position information about the attendee designated by the authentication terminal 10 according to the meeting desired person list from the attendee management database to transmit the acquired position information to the authentication terminal 10. As a result, the visitor does not need to input the name and the like of the meeting desired person, and can more easily know the position of the meeting desired person.

Third Example Embodiment

Next, the third example embodiment will be described in detail with reference to the drawings.

In the second example embodiment, the case where the names of all persons who have entered the free address floor, and the names and position information are transmitted to the authentication terminal 10 is described. In the entry/exit management system according to the second example embodiment, in a case where the number of attendees in the floor is small, the visitor can easily select the meeting desired person. However, when the number of attendees is large, it is difficult for the visitor to select a target person. Specifically, in the display as described in the modification of the second example embodiment (the display as illustrated in FIG. 16), a large number of markers are displayed and the markers overlap each other. As a result, the visitor cannot easily find the target person.

In the third example embodiment, an entry/exit management system that solves the above inconvenience will be described. When the server device 20 according to the third example embodiment receives a search request (empty search request; position information transmission request, provision request of meeting desired person candidate) from the authentication terminal 10, the server device selects at least one or more candidates suitable for the visitor (candidates of the meeting desired person). The server device 20 transmits the name and the position information about the selected candidate to the authentication terminal 10.

For example, the server device 20 reads the department to which the visitor (the user who has performed the authentication process immediately before) belongs from the user database. Further, the server device 20 refers to the user database and reads the department to which each user ID stored in the attendee management database belong. The server device 20 reads the department to which the users who has entered the floor belong from the user database.

The server device 20 compares the department to which the visitor belongs with the departments to which the attendees (all the attendees on the floor) belong, and identifies the attendees with the same department. The server device 20 regards the identified attendee as a "meeting desired person candidate" to transmit the name, the face image, and the position information thereof to the authentication terminal 10.

The authentication terminal 10 performs the display (for example, display as illustrated in FIGS. 15 and 16) described in the second example embodiment using the information acquired from the server device 10. As a result, information provided to the visitor is narrowed down, and the visitor can easily select a target person.

Figure 17:
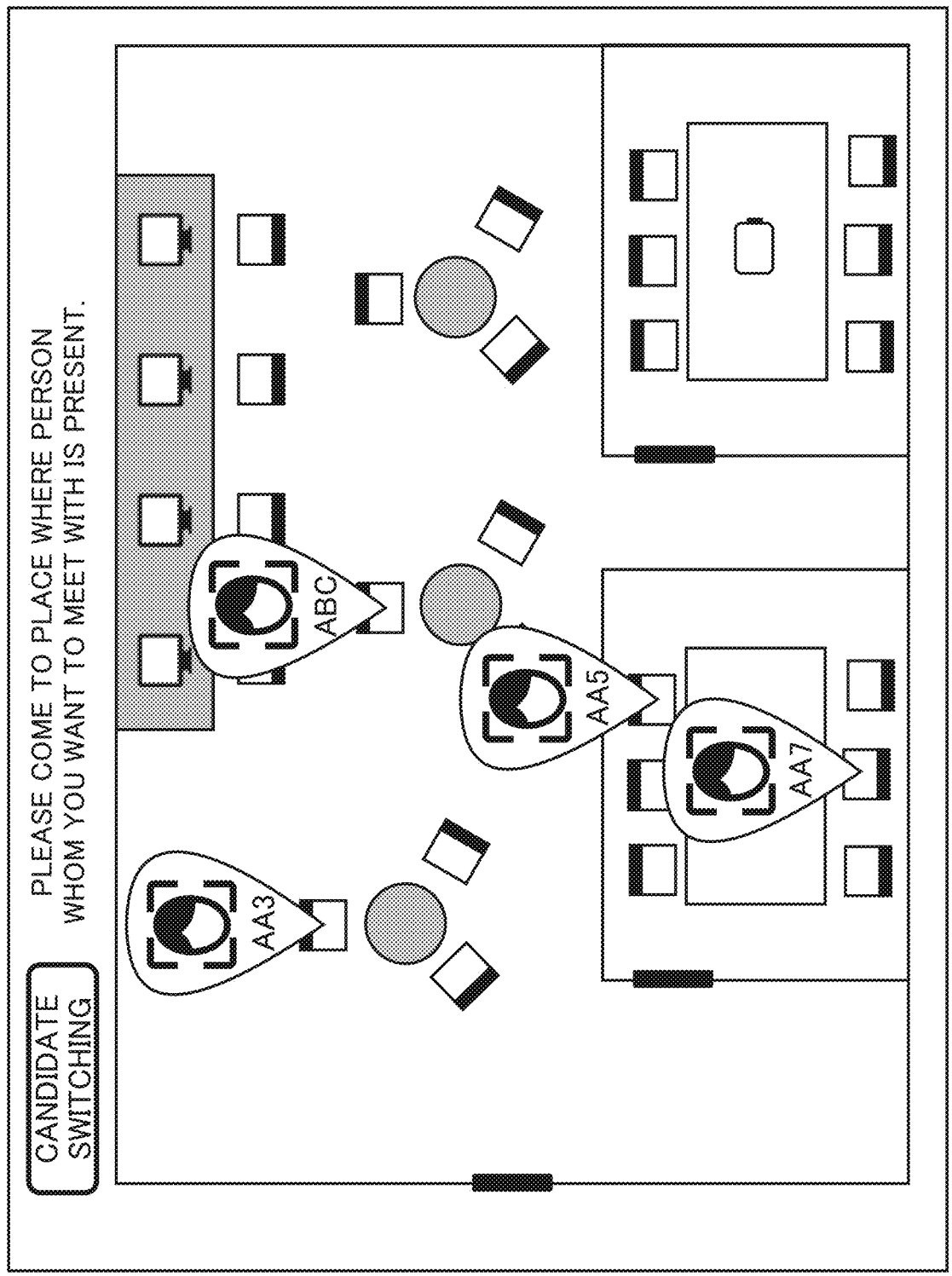
FIG. 17 is a diagram illustrating an example of display by the authentication terminal according to a third example embodiment.

However, selection of candidates for the meeting desired person by the server device 20 is not perfect, and in some cases, a person desired by the visitor may not be selected as a candidate. In preparation for such inconvenience, the authentication terminal 10 desirably includes a "candidate switching button" as illustrated in FIG. 17.

When the candidate switching button is pressed, the authentication terminal 10 notifies the server device 20 of the fact. The server device 20 switches a criterion for selecting a candidate for the meeting desired person to transmit the name, position information, and the like of the new candidate to the authentication terminal 10. For example, the server device 20 may select (determine) a candidate for a meeting desired person based on the position of the attendee. For example, the server device 20 performs a response such as selecting an attendee having a predetermined title or more as a candidate or selecting an attendee having the same title as a candidate as a candidate.

The configuration of the entry/exit management system according to the third example embodiment can be the same as that of the first example embodiment, and thus the description related to FIG. 2 is omitted. Since the processing configurations of the authentication terminal 10 and the server device 20 according to the third example embodiment can be the same as those of the first example embodiment, the description thereof will be omitted.

The search request unit 304 and the search result output unit 305 of the authentication terminal 10 may implement the operation of the authentication terminal 10 described above. The search request processing unit 205 of the server device 20 may implement the operation of the server device 20 described above.

As described above, the server device 20 according to the third example embodiment receives the search request for the position of the meeting desired person from the authentication terminal 10. The server device 20 that has received the search request selects at least one or more attendees from a plurality of attendees stored in the attendee management database. More specifically, the server device 20 selects a candidate for a meeting desired person to be provided to the authentication terminal 10 based on attributes (department to which they belong, title, and the like) of the visitor and the attendee. Thereafter, the server device 20 transmits, to the authentication terminal 10, a meeting desired person list including information (for example, the name) for identifying the selected one or more attendees. The visitor can easily find the meeting desired person by narrowing down the meeting desired person candidates by the server device 20.

Fourth Example Embodiment

Next, the fourth example embodiment will be described in detail with reference to the drawings.

In the fourth example embodiment, a case where a condition when the server device 20 selects a candidate of the meeting desired person is set from the authentication terminal 10 will be described.

The authentication terminal 10 provides an interface that enables the visitor to narrow down the meeting desired persons based on a wide variety of information (conditions). For example, the authentication terminal 10 provides an interface that makes it possible to search for the meeting desired person based on the department to which the meeting desired person belongs, the time zone in which the meeting desired person enters the area, the work state, and the like.

For example, the authentication terminal 10 displays a screen as illustrated in FIG. 18 and acquires a search method (search condition) desired by the visitor. The authentication terminal 10 further provides an interface related to the acquired search method. For example, in a case where the search based on the department to which the meeting desired person belongs is selected, the authentication terminal 10 displays a screen as illustrated in FIG. 19A. In a case where the search based on the time zone in which the meeting desired person enters the area is selected, the authentication terminal 10 displays a screen as illustrated in FIG. 19B. When the search based on the work state is selected, the authentication terminal 10 displays a screen as illustrated in FIG. 19C.

The display illustrated in FIGS. 18 and 19 is an example, and various search conditions can be input to the authentication terminal 10. For example, the authentication terminal 10 may provide the visitor with an interface that can specify a search condition by a combination of a plurality of items. For example, the authentication terminal 10 may specify both the department to which the meeting desired person belongs and the time zone, and may be able to search for a person meeting two conditions.

The authentication terminal 10 transmits a search request including the search method acquired via the GUI to the server device 20.

The server device 20 refers to the user database and the attendee management database, and identifies the attendee meeting the acquired search condition. For example, the server device 20 identifies the attendees in a department same as a department included in the search request among the attendees in the floor to transmit the name, the face image, the position information, and the like of each of the identified attendees to the authentication terminal 10.

The authentication terminal 10 outputs information as illustrated in FIGS. 15 and 16 based on the acquired information.

The configuration of the entry/exit management system according to the fourth example embodiment can be the same as that of the first example embodiment, and thus the description related to FIG. 2 is omitted. Since the processing configurations of the authentication terminal 10 and the server device 20 according to the fourth example embodiment can be the same as those of the first example embodiment, the description thereof will be omitted.

The search request unit 304 and the search result output unit 305 of the authentication terminal 10 may implement the operation of the authentication terminal 10 described above. The search request processing unit 205 of the server device 20 may implement the operation of the server device 20 described above.

As described above, the server device 20 according to the fourth example embodiment acquires the condition (for example, the department to which the meeting desired person belongs, the time zone, and the work form) for selecting at least one or more attendees from a plurality of attendees (a plurality of attendees stored in the attendee management database). The server device 20 transmits, to the authentication terminal 10, a meeting desired person list including information (for example, name and the like) for identifying the attendee selected based on the acquired condition.

Fifth Example Embodiment

Next, the fifth example embodiment will be described in detail with reference to the drawings.

In the fifth example embodiment, a case where the server device 20 controls the conference room terminal 11 will be described. The conference room terminal 11 performs control on a conference room of the user.

A user who uses the conference room (attendee in the free address floor) reserves the conference room in advance. The conference room user inputs conference room reservation information (for example, a name, an employee number, a conference room to be reserved, a use time, and the like) to the server device 20. The conference room user inputs names, employee numbers, and the like of other participants attending the conference to the server device 20. Alternatively, the other participants may input their own names and the like to the server device 20.

When the conference room user moves in front of the conference room terminal 11, the conference room terminal 11 acquires biological information (face image) of the user to transmit the biological information to the server device 20. The server device 20 performs collation using the acquired biological information, and when the authentication is successful, notifies the conference room terminal 11 of the successful authentication. The conference room terminal 11 that has received the notification opens the related gate 40 and permits the authenticated person to use the conference room.

The configuration of the entry/exit management system according to the fifth example embodiment can be the same as that of the first example embodiment, and thus the description related to FIG. 2 is omitted. Hereinafter, differences between the first to fifth example embodiments will be mainly described.

[Server Device]

Figure 20:
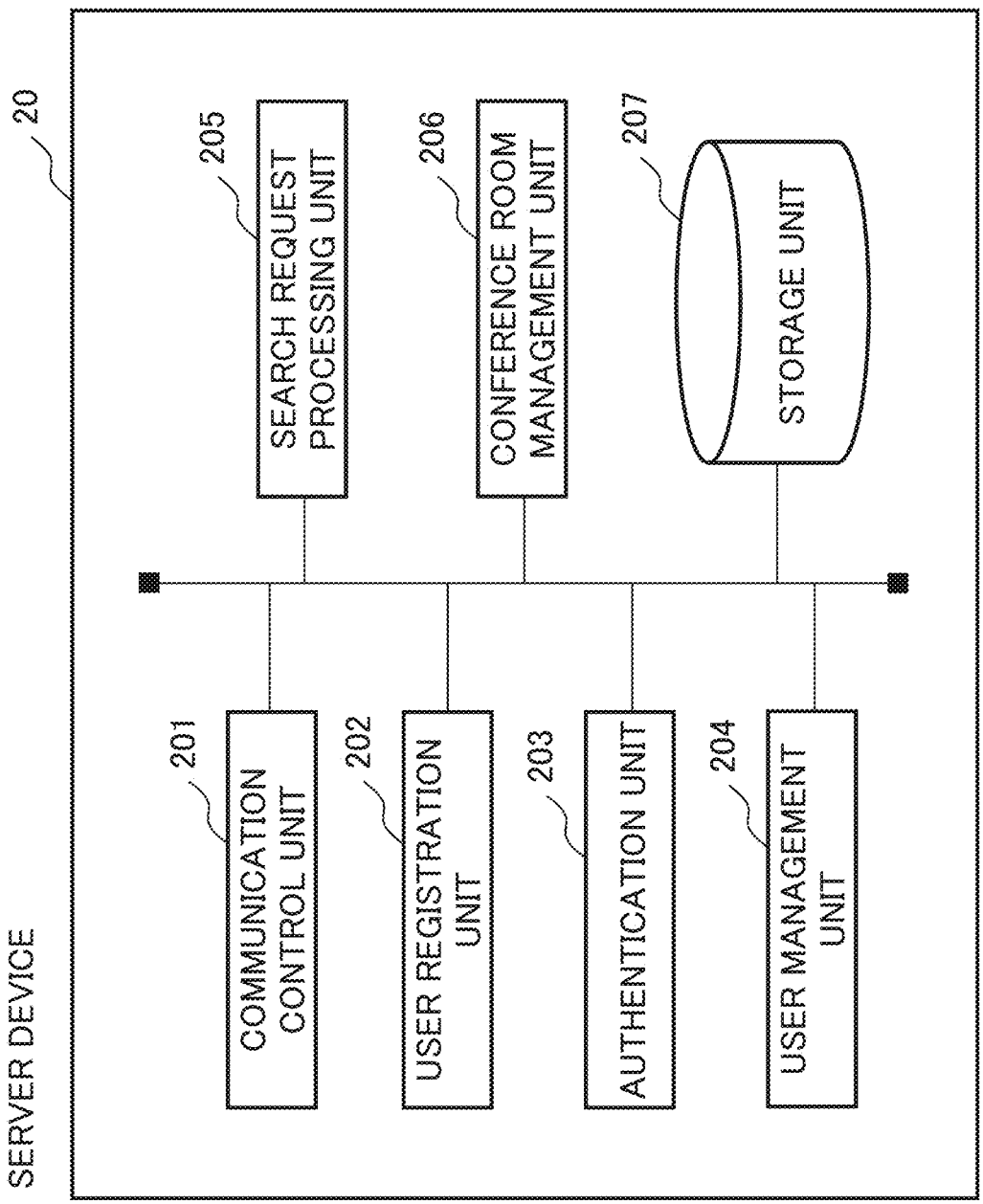
FIG. 20 is a diagram illustrating an example of a processing configuration of a server device according to a fifth example embodiment.

FIG. 20 is a diagram illustrating an example of a processing configuration (processing module) of the server device 20 according to the fifth example embodiment. The server device 20 according to the fifth example embodiment is different from the server device 20 according to the first example embodiment in that a conference room management unit 207 is added.

The conference room management unit 207 is a unit that manages the conference room in the free address flow. The conference room management unit 207 acquires conference room reservation information about the user by an arbitrary means. For example, the conference room management unit 207 displays a form for inputting the conference room reservation information on the terminal of the user, and acquires the conference room reservation information.

The conference room management unit 207 refers to the user database, and identifies the user ID based on information for identifying the person making a reservation such as the name and the employee number of the person making a reservation from the acquired conference room reservation information. In a case where the person making a reservation also inputs the name and the like of another participant, the conference room management unit 207 specifies the user ID of the another participant. The conference room management unit 207 associates the specified user ID, the use conference room, the use time, and the like with each other, and adds the associated information to the conference room management database.

For example, the conference room management unit 207 manages conference rooms by using a conference room management database as illustrated in FIG. 21. Referring to FIG. 21, it is understood that the users of ID01 to ID03 use the conference room A.

When acquiring the biological information (face image) from the conference room terminal 11, the authentication unit 203 performs collation processing using the biological information and the feature amount stored in the user database. The authentication unit 203 determines whether the user ID identified by the collation processing is stored in the conference room management database.

When the user ID is stored in the database, the authentication unit 203 notifies the conference room management unit 207 of "conference room use permitted". When the user ID is not stored in the database, the authentication unit 203 transmits "conference room use not permitted" to the conference room management unit 207.

When acquiring the authentication result (Conference room use permitted, conference room use not permitted), the conference room management unit 207 transmits the result to the conference room terminal 11 (the conference room terminal 11 that is a transmission source of the biological information).

The conference room management unit 207 transmits detailed information about the conference to the conference room terminal 11. The detailed information about the conference is information including information (for example, the name) regarding participants in the conference held in the conference room, a use time of the conference, and the like. The conference room management unit 207 generates the conference detailed information by referring to the user database and the conference room management database.

[Conference Room Terminal]

Figure 22:
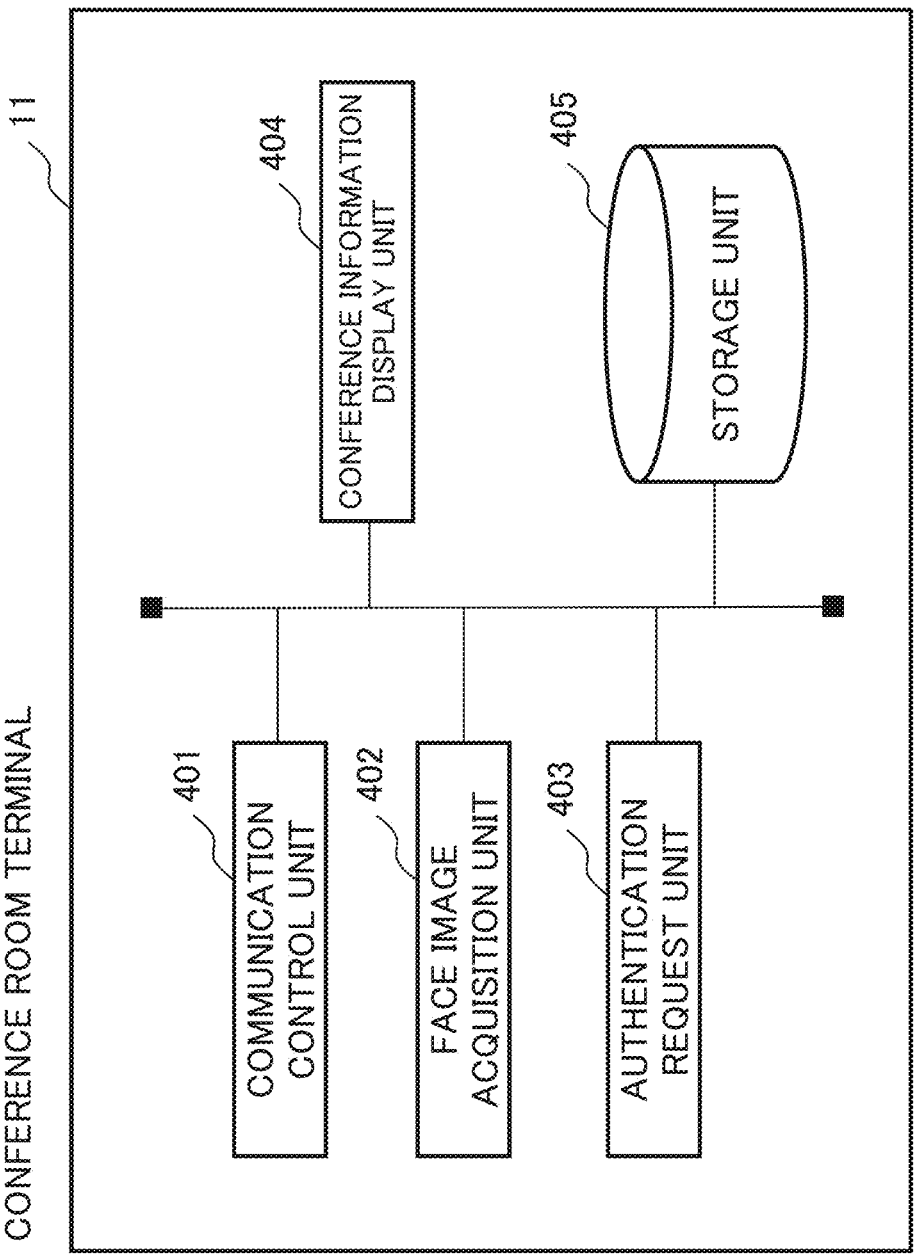
FIG. 22 is a diagram illustrating an example of a processing configuration of a conference room terminal according to the fifth example embodiment.

FIG. 22 is a diagram illustrating an example of a processing configuration (processing module) of the conference room terminal 11 according to the fifth example embodiment. Referring to FIG. 22, the conference room terminal 11 includes a communication control unit 401, a face image acquisition unit 402, an authentication request unit 403, a conference information display unit 404, and a storage unit 405.

The communication function, the biological information acquisition function, and the authentication (authentication request) function of the conference room terminal 11 can be the same as the related functions of the authentication terminal 10, and thus the description of the communication control unit 401 and the like is omitted.

The conference information display unit 404 is a unit that acquires conference detailed information from the server device 20 and performs display based on the information. For example, the conference information display unit 404 performs display as illustrated in FIG. 23. FIG. 23 is an example, and the conference information display unit 404 can perform various displays. For example, in a case where the person making a reservation inputs "the purpose of the conference" or "the agenda of the conference" as the conference room reservation information, the server device 20 transmits the information to the conference room terminal 11. The conference room terminal 11 may add these pieces of information to the display illustrated in FIG. 23.

As described above, in the fifth example embodiment, the server device 20 transmits the conference detailed information to the conference room terminal 11. Since the conference room terminal 11 can display participants, intents, and the like of the conference based on the information, attendees in the floor can participate in the conference without reservation. In this case, the user who wants to participate in the conference inputs conference room reservation information to the server device 20. Alternatively, the user who wants to participate in the conference may knock on the door of the conference room, and the conference participant may open the gate 40 from the inside. As described above, in the fifth example embodiment, since the details of the conference are notified to those other than the conference participants, the users on the floor can easily participate in the conference (participate in the conference without reservation).

Sixth Example Embodiment

Next, the sixth example embodiment will be described in detail with reference to the drawings.

In the first to fifth example embodiments, the case where the authentication terminal 10 provides information to a visitor and accepts an operation by the input/output device in which the liquid crystal panel and the touch panel are integrated is described. However, display or the like using a device as described above may cause a problem regarding privacy of a visitor.

In a sixth example embodiment, a case where protection regarding privacy of a user is enhanced will be described.

The authentication terminal 10 according to the sixth example embodiment uses an input/output device called an aerial imaging (AI) plate or an aerial display to display information or receive a visitor's operation.

The AI plate (aerial display) is a device capable of aerial image formation. The aerial display allows an image (light) to pass through a special panel made of glass, resin, or the like to form a real image in the air at an equal distance opposite the real image. The user positioned at a predetermined place with respect to the aerial display can feel as if the video floats in the air. By combining the aerial display and the distance measurement sensor, it is also possible to input an operation using a display floating in the air. That is, the authentication terminal 10 detects the spatial position of the fingertip using the distance measurement sensor, and detects that the related display operation has been input.

The authentication terminal 10 implements a GUI provided to a visitor using a device as described in Reference Literature 1 or Reference Literature 2 below.

<Reference Literature 1>
URL: https://www.assist-corp.tv/vision

Figure 24:
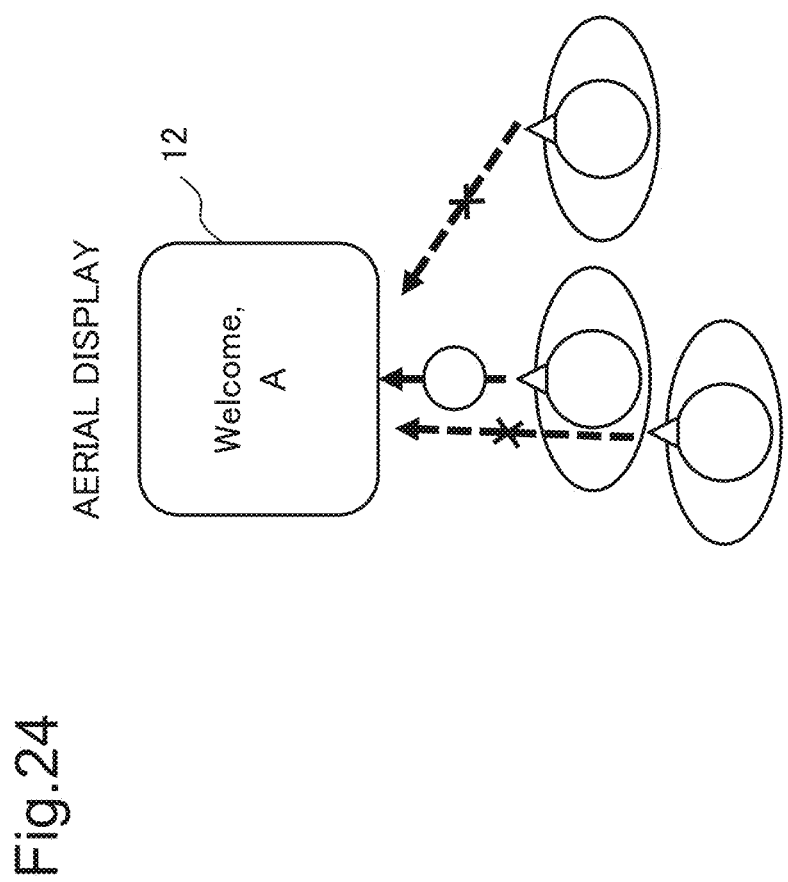
FIG. 24 is a diagram for describing an aerial display according to a sixth example embodiment.
Figure 25A:
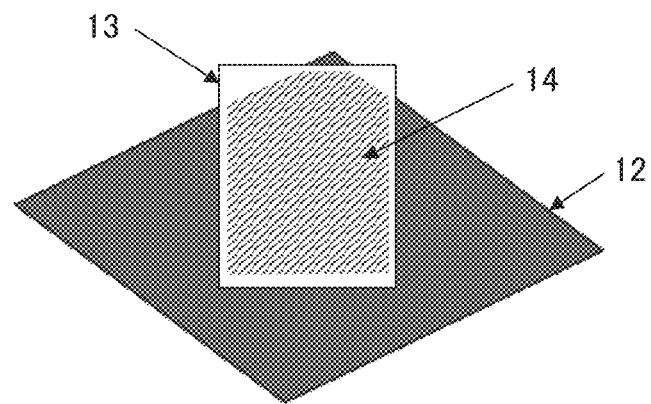
FIG. 25A is a diagram for describing the aerial display when the user is positioned in front of the aerial display according to the sixth example embodiment.
Figure 25B:
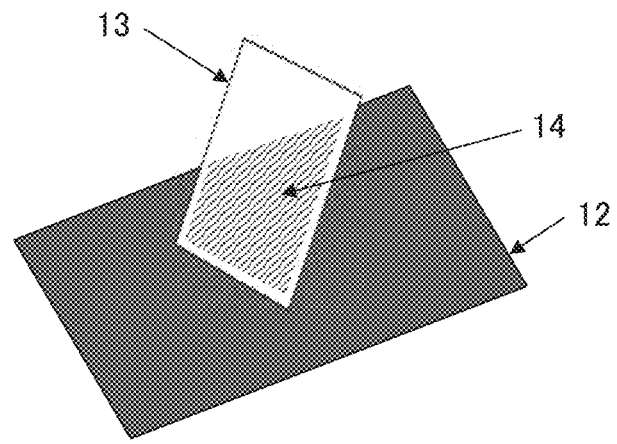
FIG. 25B is a diagram for describing the aerial display when the user is located on the lateral side with respect to the aerial display according to the sixth example embodiment.

<Reference Literature 2>
URL: https://www.asukanet.co.jp/contents/product/aerialimaging.html The input/output devices described in References 1 and 2 are configured to allow a visitor positioned at a predetermined distance to visually recognize the display. However, as illustrated in FIG. 24, a person standing behind or beside the person operating the device (the aerial display 12) cannot recognize the display content. More specifically, the user can visually recognize the content (display content) as a hologram only in a region where the aerial display 12 physically exists. Therefore, as illustrated in FIG. 25A, when the user is positioned in front of the aerial display 12, the overlapping region between the aerial display 12 and a hologram display face 13 is a visible region 14. Therefore, the user can visually recognize most of the content. On the other hand, as illustrated in FIG. 25B, when the user is located on the lateral side (right side) with respect to the aerial display 12, the overlapping region between the aerial display 12 and the hologram display face 13 is reduced. Therefore, the user can hardly visually recognize the content of the content.

In the first to fifth example embodiments, the case where the search request unit 304 controls the opening and closing of the gate 40-1 according to the authentication result from the server device 20 in consideration of the case where the visitor desires to search for the person to meet with is described. However, in a case where the search for the person to meet with by the visitor is not implemented, the authentication request unit 303 may control opening and closing of the gate 40-1. In this case, the search result output unit 305 may perform display based on the authentication result on the aerial display. For example, the search result output unit 305 outputs a message welcoming the visitor to the aerial display.

Alternatively, in a case where the search for the person to meet with by the visitor is implemented, the search request unit 304 may control opening and closing of the gate 40-1. In other words, in a case where authentication using biometric authentication by the server device 20 and authentication using another authentication method by a gesture or the like are both successful, the search request unit 304 may immediately open the gate 40-1 if the visitor does not desire to search for the person to meet with. In a case where the visitor desires to search for a person to meet with, the search request unit 304 may open the gate 40-1 after displaying the meeting desired person.

As described above, in the entry/exit management system according to the sixth example embodiment, the authentication terminal 10 requests the server device 20 to perform the authentication process using the biological information about the user, and controls opening and closing of the gate according to the authentication result acquired from the server device 20. The authentication terminal 10 outputs a display based on the authentication result to the aerial display. Since the authentication terminal 10 outputs the display based on the authentication result (for example, display using a message indicating a name of a visitor and welcoming the visitor) to the aerial display, a third party other than the visitor cannot recognize the display. As a result, the privacy of the visitor is properly protected.

Seventh Example Embodiment

Next, a seventh example embodiment will be described in detail with reference to the drawings.

In the first to sixth example embodiments, the authentication terminal 10 permits the visitor to enter the floor when the biometric authentication (face authentication) of the visitor is successful. In a seventh example embodiment, a case where a visitor is permitted to enter the floor when authentication by another authentication method (an authentication method different from the biometric authentication) is successful in addition to the biometric authentication will be described.

Specifically, the authentication terminal 10 permits a visitor to enter the floor when the system user inputs predetermined information. Examples of the predetermined information include gestures, numbers, characters, and combinations thereof. In the seventh example embodiment, a case where a gesture is input to the server device 20 in advance will be described.

Figure 26:
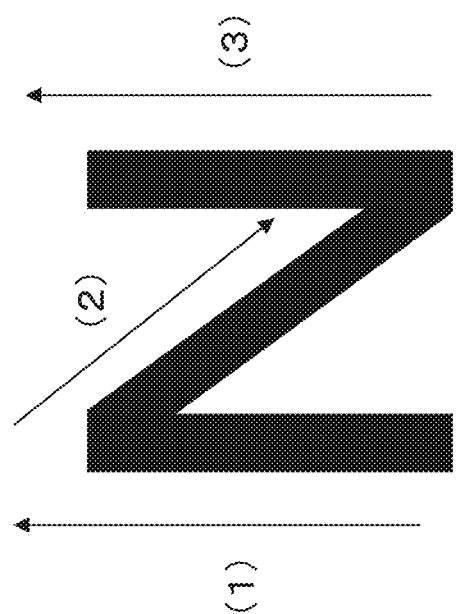
FIG. 26 is a diagram for explaining the operation of an authentication terminal according to a seventh example embodiment.

In preliminary preparation, the gesture is stored in the server device 20 together with the face image and the profile information. For example, the user inputs a gesture of tracing the shape of the character "N" as illustrated in FIG. 26. The server device 20 stores the motion of the gesture illustrated in FIG. 26, for example, the motion of the fingertip moving in the order of (1) to (3). The server device 20 stores the gesture in the user database.

When the face authentication succeeds, the server device 20 transmits the gesture stored together with the authentication result to authentication terminal 10. In the example of FIG. 26, locus information in which the fingertip moves from the bottom to the top, moves obliquely to the lower right from the top, and moves from the bottom to the top is transmitted to the authentication terminal 10.

Figure 27:
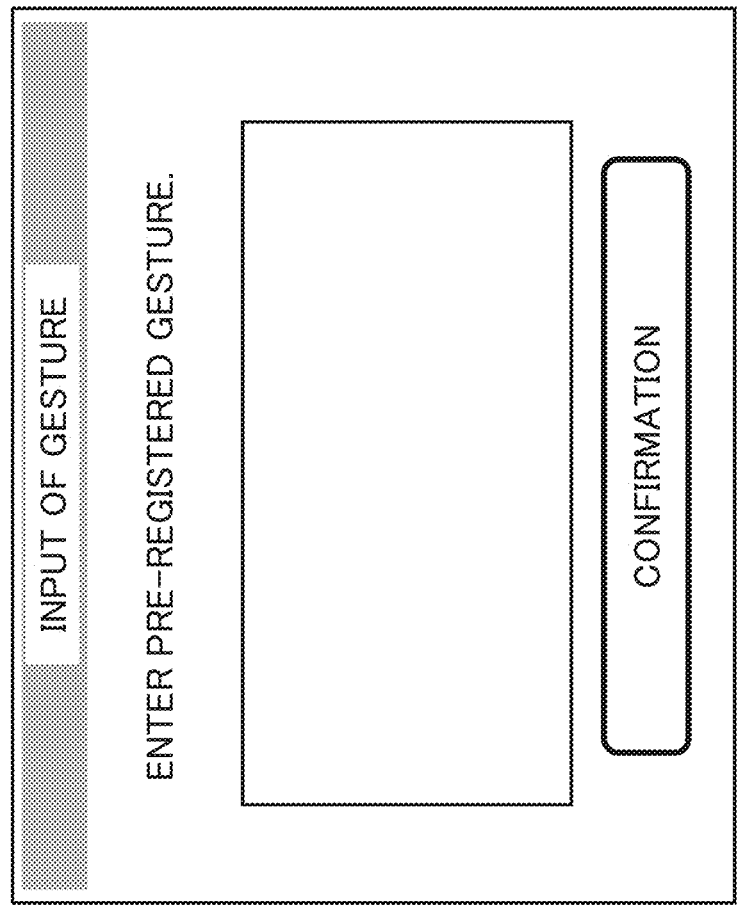
FIG. 27 is a diagram illustrating an example of display by the authentication terminal according to the seventh example embodiment.

The authentication terminal 10 instructs the visitor whose face authentication has succeeded to input a gesture stored in advance (see FIG. 27). When the authentication terminal 10 displays a locus of tracing the gesture with the fingertip of the visitor on the display and presses the confirm button, the acquisition of the gesture is completed.

When the gesture acquired from the server device 20 matches the gesture input by the visitor, the authentication terminal 10 determines that the second-stage authentication (second-factor authentication) has succeeded. When the gesture acquired from the server device 20 does not match the gesture input by the visitor, the authentication terminal 10 determines that the second-stage authentication (second-factor authentication) has failed.

The authentication terminal 10 permits the visitor to enter the floor when two authentications (biometric authentication, authentication by gesture) are successful. When any one of the two authentications (biometric authentication, authentication by gesture) fails, the authentication terminal 10 does not allow the visitor to enter the floor.

As described above, the authentication request unit 303 of the authentication terminal 10 causes the gate 40-1 to open in a case where the authentication result acquired from the server device 20 is successful and the authentication by the authentication method different from the biological information is successful. The authentication method different from the biological information is, for example, authentication using information predetermined by the user. Specifically, the authentication terminal 10 performs authentication by a gesture predetermined by the system user.

The authentication terminal 10 may change information to be provided to the visitor at the time of authentication by a gesture. For example, the authentication terminal 10 may display part of the gesture acquired from the server device 20 in advance and instruct the visitor to input the remaining gesture. For example, in a case where the shape of "N" is stored as a gesture, the authentication terminal 10 may perform a display as illustrated in FIG. 28A or 28B.

Figure 28A:
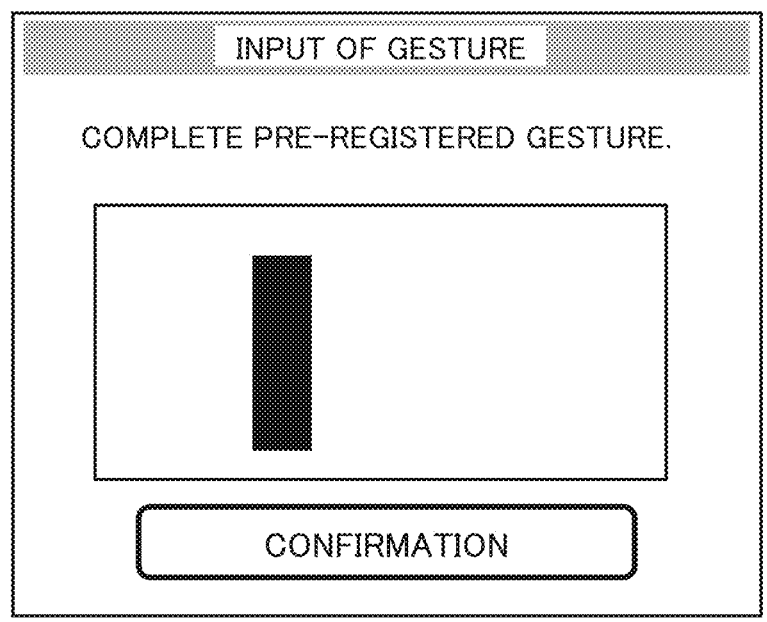
FIG. 28A is a diagram illustrating an example of display by the authentication terminal according to the seventh example embodiment.
Figure 28B:
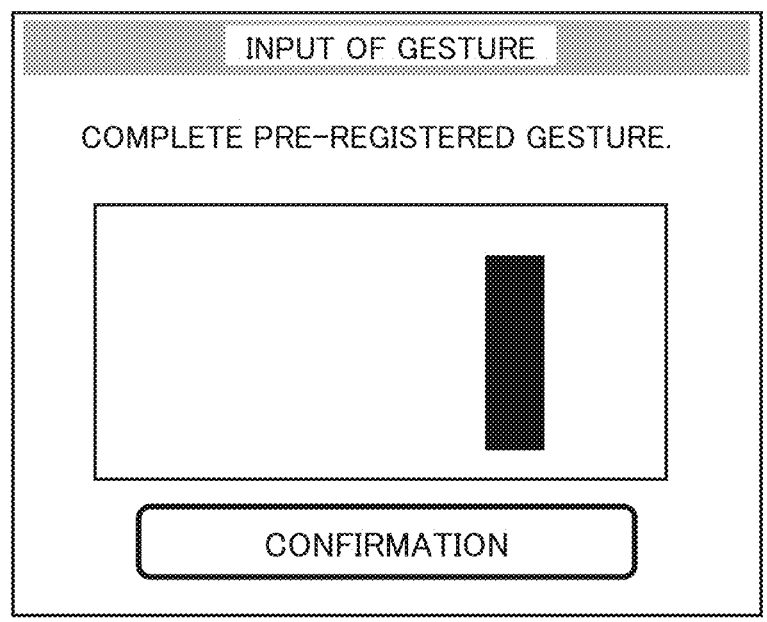
FIG. 28B is a diagram illustrating another example of display by the authentication terminal according to the seventh example embodiment.

In FIG. 28A, a straight line on the left side of the character "N" is displayed, and an instruction to input the remaining gesture is given. In FIG. 28B, a straight line on the right side of the character "N" is displayed, and an instruction to input the remaining gesture is given.

In this manner, the authentication terminal 10 displays part of the gesture used for the second-stage authentication.

Further, the authentication terminal 10 causes the gate 40-1 to open in a case where the user (visitor) completes a gesture other than the gesture part of which is displayed.

In a case where the visitor is permitted to enter the floor, the authentication terminal 10 may take a measure such that the visitor can recognize (understand) the permission. For example, a character predetermined by a visitor (system user) may be displayed on the aerial display. The system user inputs the character to the server device 20 in preliminary preparation. The server device 20 transmits information on the character (for example, image data of a character) to the authentication terminal 10 together with the result of authentication using the biological information. When the biometric authentication or the two-factor authentication is successful, the authentication terminal 10 displays the character on the aerial display. The character can be a character called an avatar (virtual self of the user) or a persona (virtual person defined by the user).

As described above, in the entry/exit management system according to the seventh example embodiment, the entry/exit of the visitor is managed by the second authentication using another information (for example, a gesture) in addition to the first authentication using the biological information. As a result, security of the entry/exit system is improved. In two-factor authentication using biological information and gestures, a third party (for example, a visitor beside or after the visitor) other than the visitor can recognize a gesture. However, since the authentication terminal 10 according to the seventh example embodiment employs a system in which part of the gesture is displayed and the visitor inputs the remaining gesture, the third party cannot recognize the gesture set by the visitor. That is, by displaying part of the gesture and allowing the visitor to complete the remaining gesture, the security of the system can be further strengthened.

Figure 29:
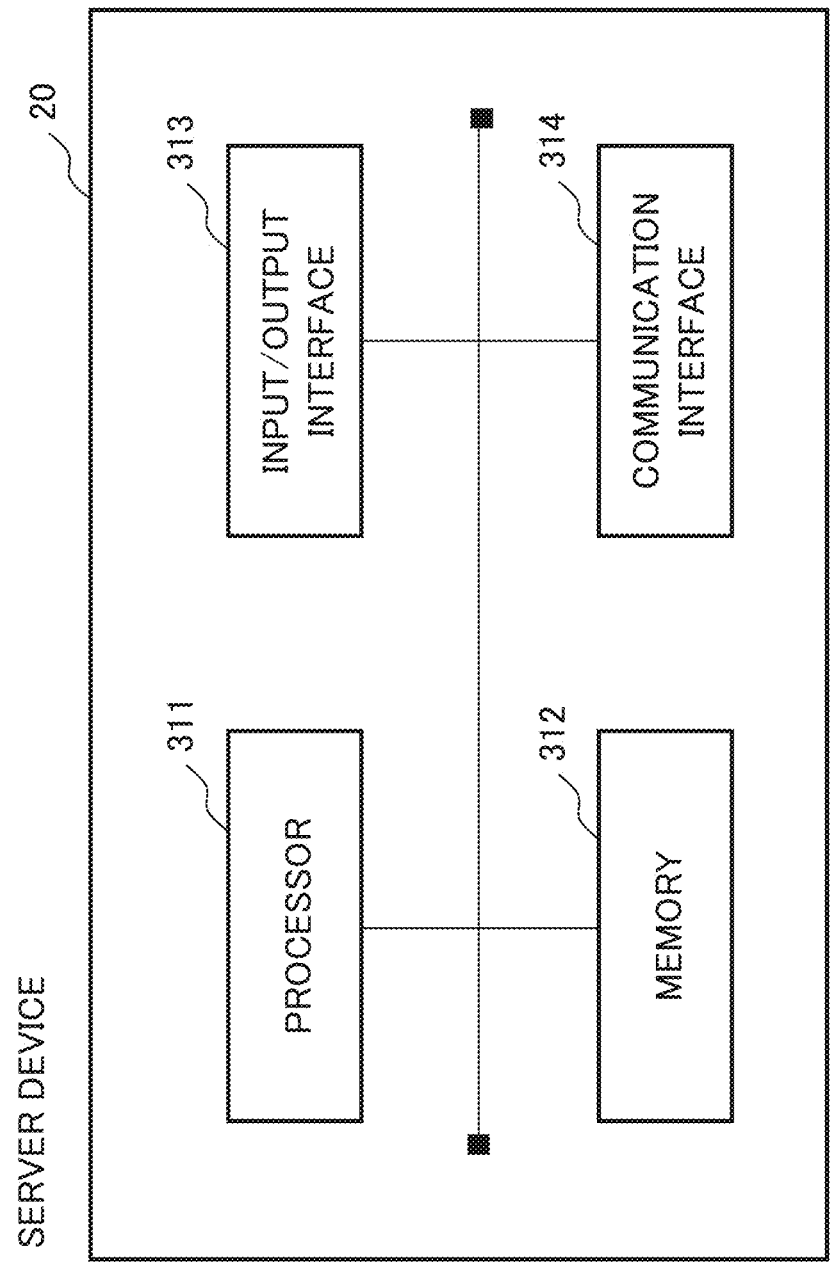
FIG. 29 is a diagram illustrating an example of a hardware configuration of a server device.

Next, hardware of each device constituting the entry/exit management system will be described. FIG. 29 is a diagram illustrating an example of a hardware configuration of the server device 20.

The server device 20 can be configured by an information processing device (so-called computer), and has the configuration illustrated in FIG. 29. For example, the server device 20 includes a processor 311, a memory 312, an input/output interface 313, a communication interface 314, and the like. The components such as the processor 311 are connected by an internal bus or the like, and are configured to be able to communicate with each other.

However, the configuration illustrated in FIG. 29 is not intended to limit the hardware configuration of the server device 20. The server device 20 may include hardware not illustrated or may not include the input/output interface 313 as necessary. The number of processors 311 and the like included in the server device 20 is not limited to the example of FIG. 29, and for example, a plurality of processors 311 may be included in the server device 20.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 20 are implemented by various processing modules. The processing module is implemented, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. The program can be downloaded via a network or updated using a storage medium storing the program. Furthermore, the processing module may be achieved by a semiconductor chip.

The authentication terminal 10 and the conference room terminal 11 can also be configured by an information processing device as in the server device 20, and since there is no difference in the basic hardware configuration from the server device 20, the description thereof will be omitted. For example, the authentication terminal 10 may include a camera device, a liquid crystal display, or the like. Specifically, the authentication terminal 10 according to the sixth and seventh example embodiments may include an "aerial display" as disclosed in References 1 and 2.

The server device 20 includes a computer, and the function of the server device 20 can be achieved by causing the computer to execute a program. The server device 20 executes the entry/exit management method by the program.

Modified Example

The configuration, operation, and the like of the entry/exit management system described in the above example embodiment are merely examples, and are not intended to limit the configuration and the like of the system.

The profile of the system user (attribute value of the user) may be input using a scanner or the like. For example, the user inputs an image related to his/her business card to the server device 20 using a scanner. The server device 20 performs optical character recognition (OCR) processing on the acquired image. The server device 20 may determine the profile of the user based on the obtained information.

In the above example embodiment, the case where the biological information related to the "face image" is transmitted from the authentication terminal 10 or the conference room terminal 11 to the server device 20 is described. However, the biological information related to "the feature amount generated from the face image" may be transmitted from the authentication terminal 10 or the like to the server device 20. The server device 20 may execute the collation processing with the feature amount stored in the user database using the acquired feature amount (feature vector).

In the above example embodiment, the case is described where the server device 20 selects the meeting desired person candidate based on the search condition input by the visitor. However, the server device 20 may select the meeting desired person candidate based on information obtained from a device or the like of another server. For example, in a case where a mail transmission history or the like can be acquired from the email server, the server device 20 may select the user who transmits and receives the mail to and from the visitor as the meeting desired person candidate. With such handling, users who are transmitting and receiving mails may be connected to induce an accidental conversation.

Alternatively, the server device 20 may select the meeting desired person candidate using the conference room reservation information. For example, the server device 20 may select a person who is scheduled to have a meeting with a visitor as a meeting desired person candidate. Alternatively, the server device 20 may select a person related to a supervisor or a subordinate of a visitor as a meeting desired person candidate.

The server device 20 may also display other information in addition to the name, the face image, and the like of the meeting desired person. For example, the server device 20 may estimate the time when the meeting desired person arrives at the free address floor from the conference room reservation information, and display information such as the arrival time and how many minutes later the meeting desired person arrives at the floor.

Alternatively, the server device 20 may notify the meeting desired person of the presence of the visitor. Specifically, in a case where the server device 20 acquires the search request including the name and the like of the meeting desired person from the visitor via the authentication terminal 10, the server device 20 may transmit an email notifying the meeting desired person of the presence of the visitor.

In the above example embodiment, the case where the authentication terminal 10 controls entry to the free address floor is described. However, the application of the authentication terminal 10 is not limited to the case of controlling entry to the free address floor. For example, the authentication terminal 10 may be used for the purpose of restricting entry to an event venue, an exhibition, or the like. That is, the authentication terminal 10 may be a terminal that performs two-factor authentication when the visitor enters the floor, or may be a terminal that makes payment through face authentication (for example, face authentication self-checkout).

The authentication terminal 10 and gate 40 described in the present disclosure can be used to manage entry and exit of a plurality of persons. For example, when a plurality of persons passes through the authentication terminal 40 and the gate 40 at the same time (substantially at the same time), it is possible to explicitly transmit the fact of authentication to only the person himself/herself (person to be authenticated). That is, the authentication terminal 10 including the aerial display can transmit the authentication result only to the person himself/herself.

In the above example embodiment, a case where in which the server device 20 transmits the names and the like of the participants participating in the conference to the conference room terminal 11 as the conference detailed information is described. However, the server device 20 may change the conference detailed information to be transmitted based on the attribute of the participant participating in the conference. Alternatively, the server device 20 may change the content of the conference detailed information according to the person standing in front of the conference room terminal 11. Alternatively, the content of the conference detailed information may be changed or whether the content is displayed may be determined according to the attribute of the user (for example, the department to which the user belongs, and the like). In this manner, regarding, whether the conference detailed information is displayed may be determined by the attribute of the user (display control is achieved by authentication information such as a face image).

When detecting that the person who has made the reservation of the conference room enters the conference room based on the conference room reservation information, the server device 20 may transmit an e-mail or the like to the remaining participants.

In the above example embodiment, two-factor authentication using the gesture is described. Instead of inputting a gesture using a fingertip, the gesture can be input by detecting movement of a line of sight. By inputting the gesture by a line of sight, a third party (for example, other visitors located behind the visitor) other than the visitor cannot recognize the content of the gesture.

In the above example embodiment, the case where the security is enhanced by displaying part of the gesture is described. In the entry/exit management system, security may be enhanced by randomly displaying a numeric keypad.

In the flow chart (flowchart and sequence diagram) used in the above description, a plurality of steps (processes) is described in order, but the execution order of the steps executed in the example embodiment is not limited to the described order. In the example embodiment, for example, the order of the illustrated steps can be changed within a range in which there is no problem in terms of content, such as executing each step in parallel.

The above example embodiments have been described in detail in order to facilitate understanding of the present disclosure, and it is not intended that all the configurations described above are necessary. In a case where a plurality of example embodiments is described, each example embodiment may be used alone or in combination. For example, part of the configuration of the example embodiment can be replaced with the configuration of another example embodiment, or the configuration of another example embodiment can be added to the configuration of the example embodiment. Furthermore, it is possible to add, delete, and replace other configurations for part of the configuration of the example embodiment.

Although the industrial applicability of the present invention is apparent from the above description, the present invention can be suitably applied to an entry/exit management system or the like performed at a free address floor of a company or the like.

Some or all of the above example embodiments may be described as the following supplementary notes, but are not limited to the following.

[Supplementary Note 1]

A server device includes an acquisition unit that acquires biological information of each of a plurality of users who uses an entry/exit management system, a user database that stores a user ID for identifying each user and the biological information in association with each other, an attendee management database that stores the user ID related to an attendee in a restricted area where entry/exit is restricted, and position information about the attendee in association with each other, and a processing unit that transmits, in a case where authentication using biological information stored in the user database has succeeded, to an authentication terminal that permits a successfully authenticated user to enter the restricted area, position information about a meeting desired person whom a visitor desires to meet with.

[Supplementary Note 2]

The server device according to Supplementary note 1, in which the processing unit transmits position information about the meeting desired person to the authentication terminal in response to receiving a search request for a position of the meeting desired person from the authentication terminal.

[Supplementary Note 3]

The server device according to Supplementary note 2, in which in a case where the search request including meeting desired person information that is information for identifying the meeting desired person is received from the authentication terminal, the processing unit identifies a related user ID from the user database using the meeting desired person information and acquires position information about the meeting desired person from the attendee management database using the identified user ID.

[Supplementary Note 4]

The server device according to Supplementary note 1, in which when receiving a search request for a position of the meeting desired person from the authentication terminal, the processing unit transmits, to the authentication terminal, a meeting desired person list including information for identifying at least one or more attendees stored in the attendee management database.

[Supplementary Note 5]

The server device according to Supplementary note 4, in which the processing unit acquires position information about an attendee designated according to the meeting desired person list from the attendee management database to transmit the acquired position information to the authentication terminal.

[Supplementary Note 6]

The server device according to Supplementary note 1, in which when receiving a search request for a position of the meeting desired person from the authentication terminal, the processing unit selects at least one or more attendees from a plurality of attendees stored in the attendee management database, and transmits, to the authentication terminal, a meeting desired person list including information for identifying the selected one or more attendees.

[Supplementary Note 7]

The server device according to Supplementary note 6, in which the processing unit acquires, from the authentication terminal, a condition for selecting at least one or more attendees from a plurality of attendees stored in the attendee management database to transmit, to the authentication terminal, a meeting desired person list including information for identifying an attendee selected based on the acquired condition.

[Supplementary Note 8]

An entry/exit management system includes a server device including an acquisition unit that acquires biological information of each of a plurality of users who uses the system, a user database that stores a user ID for identifying each user and the biological information in association with each other, an attendee management database that stores the user ID related to an attendee in a restricted area where entry/exit is restricted, and position information about the attendee in association with each other, and a processing unit that processes a request from a terminal, and an authentication terminal that permits, in a case where authentication using biological information stored in the user database has succeeded, a successfully authenticated user to enter the restricted area, in which the processing unit transmits position information about a meeting desired person whom a visitor desires to meet with to the authentication terminal.

[Supplementary Note 9]

The entry/exit management system according to Supplementary note 8, in which the processing unit transmits position information about the meeting desired person to the authentication terminal in response to receiving a search request for a position of the meeting desired person from the authentication terminal.

[Supplementary Note 10]

The entry/exit management system according to Supplementary note 9, in which in a case where the search request including meeting desired person information that is information for identifying the meeting desired person is received from the authentication terminal, the processing unit identifies a related user ID from the user database using the meeting desired person information and acquires position information about the meeting desired person from the attendee management database using the identified user ID.

[Supplementary Note 11]

The entry/exit management system according to Supplementary note 8, in which when receiving a search request for a position of the meeting desired person from the authentication terminal, the processing unit transmits, to the authentication terminal, a meeting desired person list including information for identifying at least one or more attendees stored in the attendee management database.

[Supplementary Note 12]

The entry/exit management system according to Supplementary note 11, in which the processing unit acquires position information about an attendee designated according to the meeting desired person list from the attendee management database to transmit the acquired position information to the authentication terminal.

[Supplementary Note 13]

The entry/exit management system according to Supplementary note 8, in which when receiving a search request for a position of the meeting desired person from the authentication terminal, the processing unit selects at least one or more attendees from a plurality of attendees stored in the attendee management database, and transmits, to the authentication terminal, a meeting desired person list including information for identifying the selected one or more attendees.

[Supplementary Note 14]

The entry/exit management system according to Supplementary note 13, in which the processing unit acquires, from the authentication terminal, a condition for selecting at least one or more attendees from a plurality of attendees stored in the attendee management database to transmit, to the authentication terminal, a meeting desired person list including information for identifying an attendee selected based on the acquired condition.

[Supplementary Note 15]

An entry/exit management method including, by a server device, acquiring biological information of each of a plurality of users who uses an entry/exit management system, storing, in a user database, a user ID for identifying each user and the biological information in association with each other, storing, in an attendee management database, the user ID related to an attendee in a restricted area where entry/exit is restricted, and position information about the attendee in association with each other, and transmitting, in a case where authentication using biological information stored in the user database has succeeded, to an authentication terminal that permits a successfully authenticated user to enter the restricted area, position information about a meeting desired person whom a visitor desires to meet with.

[Supplementary Note 16]

A computer-readable storage medium storing a program for causing a computer mounted on a server device to execute, a step of acquiring biological information of each of a plurality of users who uses an entry/exit management system, a step of storing, in a user database, a user ID for identifying each user and the biological information in association with each other, a step of storing, in an attendee management database, the user ID related to an attendee in a restricted area where entry/exit is restricted, and position information about the attendee in association with each other, and a step of transmitting, in a case where authentication using biological information stored in the user database has succeeded, to an authentication terminal that permits a successfully authenticated user to enter the restricted area, position information about a meeting desired person whom a visitor desires to meet with.

The disclosures of the cited prior art documents are incorporated herein by reference. While the exemplary embodiments of the present invention have been described, the invention is not limited to these embodiments. It will be understood by those of ordinary skill in the art that these embodiments are exemplary only and that various variations may be made therein without departing from the scope and spirit of the present invention as defined by the claims. That is, it goes without saying that the present invention includes various modifications and corrections that can be made by those of ordinary skill in the art in accordance with the entire disclosure including the claims and the technical idea.

REFERENCE SIGNS LIST 10 authentication terminal
11, 11-1, 11-2 conference room terminal
12 aerial display
13 hologram display face
14 visible region
20, 100 server device
30 camera device
40, 40-1 to 40-3 gate
101 acquisition unit
102 user database (user DB)
103 attendee management database (attendee management DB)
104 processing unit
201, 301, 401 communication control unit
202 user registration unit
203 authentication unit
204 user management unit
205 search request processing unit
206, 306, 405 storage unit
207 conference room management unit
211 user information acquisition unit
212 ID generation unit
213 feature amount generation unit
214 entry management unit
302, 402 face image acquisition unit
303, 403 authentication request unit
304 search request unit
305 search result output unit
311 processor
312 memory
313 input/output interface
314 communication interface
404 conference information display unit

What is claimed is:

1. A server device comprising:
one or more memories storing instructions; and
one or more processors configured to execute the instructions to:
acquire biological information of each of a plurality of users who use an entry/exit management system;
store a user ID for identifying each user and the biological information in association with each other;
store the user ID related to an attendee in a restricted area where entry/exit is restricted, and position information regarding the attendee in association with each other;
receive a search request in a case where a visitor who intends to enter the restricted area is authenticated based on the biological information, the search request including meeting desired person information from an authentication terminal, the authentication terminal permitting the authenticated visitor to enter the restricted area, the meeting desired person information being acquired from the authentication terminal by controlling a display of the authentication terminal to prompt the authenticated visitor to input the meeting desired person information; and
in response to the search request, transmit position information about the attendee who is a meeting desired person with whom the visitor desires to meet, the position information corresponding to the meeting desired person information.

2. The server device according to claim 1,
wherein the one or more processors are configured to execute the instructions to, in a case where the search request including the meeting desired person information that is information for identifying the meeting desired person is received from the authentication terminal, identify a related user ID user database using the meeting desired person information and acquire the position information about the meeting desired person using the identified user ID.

3. The server device according to claim 1,
wherein the one or more processors are configured to execute the instructions to:
receive, in a case where the visitor who intends to enter the restricted area is authenticated based on the biological information, a request for a meeting desired person candidate from the authentication terminal;
control the display of the authentication terminal to provide the authenticated visitor a meeting desired person list, the meeting desired person list including information for identifying at least one or more attendees that have been stored, the meeting desired person list being displayed as the display to prompt the authenticated visitor to input the meeting desired person information; and
transmit, when the meeting desired person information selected from the meeting desired person list is acquired from the authentication terminal, the position information corresponding to the meeting desired person information.

4. The server device according to claim 3,
where in the one or more processors are configured to execute the instructions to acquire position information about an attendee designated according to the meeting desired person list to transmit the acquired position information to the authentication terminal.

5. The server device according to claim 1,
wherein the one or more processors are configured to execute the instructions to, when receiving a search request for a position of the meeting desired person from the authentication terminal, select at least one or more attendees from a plurality of attendees stored, and transmit, to the authentication terminal, a meeting desired person list including information for identifying the selected one or more attendees.

6. The server device according to claim 5,
wherein the one or more processors are configured to execute the instructions to acquire, from the authentication terminal, a condition for selecting the at least one or more attendees from the plurality of attendees stored to transmit, to the authentication terminal, a meeting desired person list including information for identifying an attendee selected based on the acquired condition.

7. An entry/exit management method comprising:
by a server device,
acquiring biological information of each of a plurality of users who use an entry/exit management system;
storing, in a user database, a user ID for identifying each user and the biological information in association with each other;
storing, in an attendee management database, the user ID related to an attendee in a restricted area where entry/exit is restricted, and position information regarding the attendee in association with each other;
receiving a search request in a case where a visitor who intends to enter the restricted area is authenticated based on the biological information, the search request including meeting desired person information from an authentication terminal, the authentication terminal permitting the authenticated visitor to enter the restricted area, the meeting desired person information being acquired from the authentication terminal by controlling a display of the authentication terminal to prompt the authenticated visitor to input the meeting desired person information; and
in response to the search request, transmitting position information about the attendee who is a meeting desired person whom the visitor desires to meet with, the position information corresponding to the meeting desired person information.

8. A non-transitory computer-readable storage medium storing a program for causing a computer mounted on a server device to execute:
acquiring biological information of each of a plurality of users who use an entry/exit management system;
storing, in a user database, a user ID for identifying each user and the biological information in association with each other;
a step of storing, in an attendee management database, the user ID related to an attendee in a restricted area where entry/exit is restricted, and position information regarding the attendee in association with each other;
receiving a search request in a case where a visitor who intends to enter the restricted area is authenticated based on the biological information, the search request including meeting desired person information from an authentication terminal, the authentication terminal permitting the authenticated visitor to enter the restricted area, the meeting desired person information being acquired from the authentication terminal by controlling a display of the authentication terminal to prompt the authenticated visitor to input the meeting desired person information; and
in response to the search request, transmitting position information about the attendee who is a meeting desired person whom the visitor desires to meet with, the position information corresponding to the meeting desired person information.

* * * * *